United States Patent
Cluff et al.

(10) Patent No.: US 7,340,042 B2
(45) Date of Patent: Mar. 4, 2008

(54) SYSTEM AND METHOD OF SUBSCRIPTION IDENTITY AUTHENTICATION UTILIZING MULTIPLE FACTORS

(75) Inventors: Wayne P. Cluff, Holland, PA (US); Jeffrey D. Randol, Solebury, PA (US); Daryl G. Jurbala, New Hope, PA (US); Peter J. Soufleris, Holland, PA (US)

(73) Assignee: VoiceVerified, Inc., New Hope, PA (US)

(*) Notice: Subject to any disclaimer, the term of this patent is extended or adjusted under 35 U.S.C. 154(b) by 19 days.

(21) Appl. No.: 11/395,511

(22) Filed: Mar. 31, 2006

(65) Prior Publication Data

US 2007/0106517 A1 May 10, 2007

Related U.S. Application Data

(60) Provisional application No. 60/729,119, filed on Oct. 21, 2005.

(51) Int. Cl.
*H04M 1/64* (2006.01)
(52) U.S. Cl. .................................. 379/88.02; 704/273
(58) Field of Classification Search ............. 379/88.02; 704/273
See application file for complete search history.

(56) References Cited

U.S. PATENT DOCUMENTS

| | | | |
|---|---|---|---|
| 3,752,904 A | 8/1973 | Waterbury | |
| 5,913,196 A | 6/1999 | Talmor et al. | |
| 6,510,415 B1 | 1/2003 | Talmor et al. | |
| 6,829,711 B1 | 12/2004 | Kwok et al. | |
| 6,920,435 B2 | 7/2005 | Hoffman et al. | |
| 6,934,849 B2 | 8/2005 | Kramer et al. | |
| 7,203,653 B1 * | 4/2007 | McIntosh | 704/273 |
| 2002/0059521 A1 | 5/2002 | Tasler | |
| 2003/0046554 A1 | 3/2003 | Leydier et al. | |
| 2003/0048904 A1 | 3/2003 | Wang et al. | |
| 2003/0200447 A1 | 10/2003 | Sjoblom | |
| 2004/0010698 A1 | 1/2004 | Rolfe | |
| 2004/0243514 A1 | 12/2004 | Wankmueller | |
| 2004/0250085 A1 | 12/2004 | Tattan et al. | |
| 2005/0075985 A1 | 4/2005 | Cartmell | |
| 2005/0138391 A1 | 6/2005 | Mandalia et al. | |
| 2005/0216953 A1 | 9/2005 | Ellingson | |

* cited by examiner

*Primary Examiner*—Gerald Gauthier
(74) *Attorney, Agent, or Firm*—Pryor Cashman LLP; Barry E. Negrin

(57) ABSTRACT

A system and method of providing voice authentication to institutional customers having consumers or users. The system includes an enrollment module, a verification module, and a database. Each institutional customer has an authentication profile on the system that includes both i) instructions indicating which one or more of the voice biometric engines are to be used for a given consumer's enrollment and/or authentication, and ii) variables for implementing those instructions. A given institutional customer may have more than one set of instructions or variables for different classes of users. Vocal information is received from a user, and a baseline voiceprint is constructed therefrom for enrollment. Subsequently, more vocal information is received from the user to construct a temporary voiceprint. The temporary voiceprint is compared to a corresponding baseline voiceprint in accordance with the institutional customer's authentication profile. The profile is preferably remotely configurable by the institutional customer.

58 Claims, 12 Drawing Sheets

Call-In Enrollment

Call-Out Enrollment

Embedded Audio Enrollment

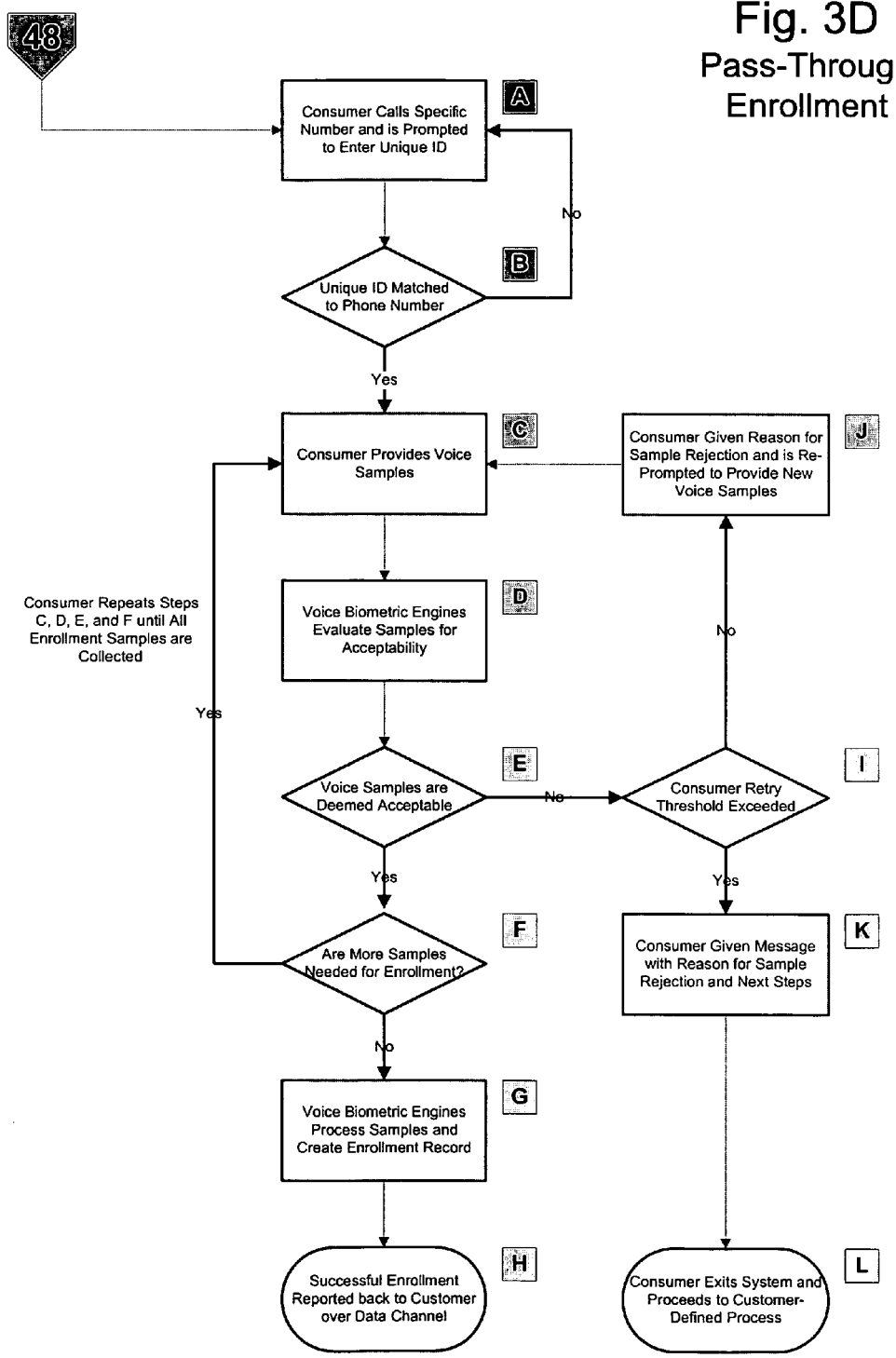

Call-In Verification

Call-Out Verification

Embedded Audio Verification

Pass-Through Verification

Check Status Request

Ping Request

SYSTEM AND METHOD OF SUBSCRIPTION IDENTITY AUTHENTICATION UTILIZING MULTIPLE FACTORS

RELATED APPLICATIONS

Domestic priority is claimed from U.S. Provisional Patent Application No. 60/729,119 filed Oct. 21, 2005.

BACKGROUND OF THE INVENTION

1. Field of the Invention

The invention relates to the field of identity authentication. More specifically, the invention relates to systems and methods of identity authentication by voice biometric verification.

2. Description of Related Art

Modern commercial transactions are becoming increasingly susceptible to identity theft, especially for remote transactions in which there is little or no direct personal contact between the consumer and the goods or services provider (GSP). Identity theft occurs whenever an unauthorized individual is granted access to or approved for a transaction while using someone else's identity, or unauthorized access to physical files, PCs/PDAs, employee records, and the like. It is a worldwide problem whose annual cost currently exceeds $200 billion. This problem threatens the further adoption of consumer-driven, self-service, and cost-savings technologies, negatively affects customer relationships and brand value, erodes profit margins, drives new legislative burdens, and increases the threat of new litigation.

Various methods of identity authentication have been implemented conventionally, including the use of passwords, access cards, and the like. The chief difficulty with such identity indicators is that they are subject to loss or theft.

One more recent type of indicator in use in the identity authentication industry is that of the individual's voice. In a typical voice biometric system, a consumer provides a voice sample when signing up or enrolling for a service, and when a bank, merchant, or customer wishes to have a consumer's identity verified at a subsequent time, the consumer is asked to provide a current sample which is compared against the stored sample. If the samples match within certain parameters, the current sample is deemed to pass the authentication or verification test, indicating that the instant speaker is the same person who provided the baseline voice sample.

Voice authentication is based on the fact that the characteristics of each person's voice differ in terms of pitch, tone, volume, and other characteristics. These differences make the voice uniquely distinguishable and the chance that all of these are exactly the same in any two people extremely low. An individual's voiceprint is as unique to them as his or her fingerprint.

Voice authentication is not the same as speech recognition. Speech recognition is the process of identifying what words have been spoken, not identifying who spoke them. Speech recognition can be used in combination with voice authentication to make it more powerful. For example, if the user is required to speak a password, the voice biometric can confirm the person's identity, and speech recognition can be used to validate that the password given is correct. The combination of the two creates a highly accurate authentication mechanism.

With voice authentication, the voice characteristics (data) are processed by the use of algorithms that authenticate the voice. All of the algorithms use some combination of time and frequency to determine whether two voice samples match.

Voice authentication works by comparing two different samples of an individual's voice. The reference sample is one where the identity of the speaker is tied to the sample itself (i.e.; this is John Doe's voice). A second voice sample is then compared to John Doe's reference sample. There are two approaches to comparing the voice samples, text dependent and text independent.

"Text dependent" means that the two voiceprints being compared must be the same words or phrases as were previously captured. Example: John Doe speaks the phrase "serendipity today" and it is compared to a recording of someone speaking that same phrase. This is the more simple of the two because the patterns being compared will match more closely.

The second approach is text independent, meaning that the two voiceprints are not necessarily of the same words or phrases. Example: John Doe's speech patterns are captured and compared to someone speaking conversationally. In this case, the analysis attempts to find common patterns between the two samples within the words. Text independent analysis requires a longer sample to compare.

A number of different voice biometric systems have been described, for example, U.S. Pat. No. 6,934,849 to Kramer et al., U.S. Pat. No. 6,920,435 to Hoffman et al., U.S. patent application Ser. No. 2005/0138391 to Mandalia et al., U.S. patent appl'n Ser. No. 2004/0010698 to Rolfe, the teachings of which are hereby incorporated by reference herein. Conventional voice identity authentication methods such as these typically require that additional, customized hardware (computer and telephony devices) be purchased, configured, and placed within the customer's own computing environment. This adds considerable expense to the identity validation process, as well as on-going training, maintenance, data storage, compliance, and other burdens on the customer. These conventional systems also are inflexible in configuration, offering essentially the same type of identity challenge to each individual. However, different institutional customers may require very different authentication solutions; indeed, a single customer may require a variety of different levels of authentication for its different categories of consumers.

SUMMARY OF THE INVENTION

The above and other problems in the prior art are solved by the invention, which is a system and a method of providing third-party voice authentication to institutional customers who may also have their own customers, users, or consumers. Institutional customers have various business rules established that periodically require them to validate the identity of one of their own customers, the consumers. Validating a consumer's identity first requires some form of enrollment (registration) to occur. The consumer is prompted to contact the system by a voice link to reach a phone system such as an IVR system. The consumer provides a voice sample in accordance with instructions provided by enrollment logic on the system. Depending on which customer a given consumer is enrolling for, the enrollment process will employ one or more voice biometric engines to acquire a satisfactory sample. A file representative of the voice print sample is stored on the inventive system's database. Once a consumer is enrolled (registered) in a system, he or she can later be verified when the company requires it.

Verification rules are configurable for each customer (some rules being remotely configurable by the customer) and are stored in the system as a customer configuration file typically at the database, or on a call manager, or other locations in the system. When the customer wants to verify the identity of a consumer, e.g., a person who is using one of their cards to make a purchase over the Internet, a request is made to the inventive system via a WAN or similar connection. The consumer would be prompted to supply a voice sample via a voice link or via embedded audio (e.g., to be collected by the institutional customer) over a data channel. This sample would be collected, analyzed, and compared to the "base" voice print for the consumer via the voice biometric engines residing on the verification module. The inventive system would then return a "pass" or "fail" result to the institutional customer, depending on customer-supplied tolerances, as well as the actual raw score of the verification.

As an example, an enrollment event may occur when a bank issues a consumer a new credit card. As part of the bank's identity theft prevention program, it may require all of their credit card holders to enroll using the inventive system. A simplified listing of steps includes the following. The consumer initially receives his or her new credit card in the mail. Before using the card, the consumer is required to call an 800 number to register it. After being prompted to type in his Social Security number, or home telephone number, or other identifying information, the customer's business process assigns the consumer a unique ID and then seamlessly transfers the consumer to the inventive system in order to create a baseline voiceprint. The inventive system prompts the consumer to repeat a series of random numerals and/or word phrases. The prompting is repeated one or more times, using different numeric sequences and/or word phrases, until the voice biometric engines have sufficient samples to create a unique voiceprint for the consumer. Then, the customer and consumer are preferably notified by the inventive system that a successful enrollment has occurred.

A verification event may occur when the bank's business rules decide that it makes sense for the consumer's identity to be checked (verified)—for example, if the consumer is making a large retail purchase online (using a personal computer over the Internet). A simplified listing of steps includes the following. The consumer is shopping online and he or she decides to purchase a new high-definition television for $8,500. The bank's internal authorization system determines that the consumer's account is in good standing, and that there was no lost credit card reported. However, since the consumer only averages $500 per month spending with their credit card, it is determined that this transaction should be verified. The bank's processing routine sends a message to the consumer's computer screen that provides them with a unique ID number and asks them to call an 800 number to verify their identity. An alternate scenario allows the consumer to click a button on their current web page to perform voice verification using their PC's microphone. The consumer either calls in to the inventive system or is directly linked to it via their current PC session. If the consumer calls in, he is first prompted to either say or enter the unique ID number. If the consumer enters the inventive system via an Internet connection, their unique ID number is already known and the process skips this step. The inventive system prompts the consumer to repeat a series of random numerals and/or word phrases. These audio samples are processed by the instant invention's biometric engine(s) and compared to the existing template associated with the consumer through their unique ID, producing a score. If this score exceeds a given threshold, the consumer is verified. This process may be repeated several times, using different numeric sequences and/or word phrases, allowing for either multiple failures or requiring multiple verifications, or both, depending on business security requirements. The inventive system then sends a message back to the customer and the consumer saying that the consumer has or has not been verified, as being who he says he is.

Specifically, one aspect of the invention is a system of providing subscription voice authentication to institutional customers having consumers or other users. A first communication link is accessible by the consumers, and software associated with the first communication link prompts the consumers to enter vocal responses. The software preferably includes interactive voice response (IVR) software. The system includes an enrollment module in communication with the first communication link for collecting voice samples of the consumers from the prompted vocal responses and constructing baseline voiceprints of the voice samples. The system also includes a verification module in communication with the first communication link and the enrollment module for collecting voice samples and constructing temporary voiceprints for comparison to corresponding baseline voiceprints. At least one voice biometric engine resides on the system, on one or both of the modules, and are accessible by the verification module for determining how similar a given temporary voiceprint is to one of the baseline voiceprints. Each of the institutional customers has a profile residing on the system. The profile has i) instructions indicating which one or more of the voice biometric engines are to be used for a corresponding of the institutional customer's consumer's enrollment or voice authentication, and ii) variables for implementing the instructions. A second communication link is provided between the system and the institutional customers, and a call manager may be provided for routing inbound communication from the institutional customers and/or their consumers.

Preferably, at least one of the variables in the profile is remotely configurable by the institutional customer via the second communication link. The second communication link is preferably an application program interface (API). The remotely configurable variables in the profile preferably include at least any one or more of the following: number of enrollment retries, verification retries, prompt sets, or threshold levels. The profile may include different values for the variables for different classes of consumers for the same institutional customer.

The first communication link is accessible by the consumers, optionally at the direction of the institutional customers, and preferably includes at least one call processor. The system also preferably includes a database upon which the baseline voiceprints are stored. The first communication link may also allow communication between the consumer and the institutional customer and include means for allowing the institutional customers to receive the collected voice samples from the consumers, as well as means for transmitting the collected voice samples from the institutional customers to the server via a data channel. Alternatively, the first communication link need not access the institutional customer at all.

The voice biometric engines further preferably include enrollment engines resident on the enrollment module and verification engines resident on the verification module. The enrollment engines collect voice samples, process the voice samples for uniqueness, and construct the baseline voiceprints during enrollment of a consumer. The verification engines collect voice samples, process the voice samples for uniqueness, and construct the temporary voiceprints. The baseline and temporary voiceprints preferably include a mathematical model or representation of how a specific person speaks. When the verification module compares one of the temporary voiceprints to one of the baseline voiceprints, the verification module generates a score indicative of how similar the baseline and the temporary voiceprints are, and the system transmits the score to the institutional customer (which may or may not be upon the request of the customer).

In another aspect of the invention, a method of providing third-party voice authentication to institutional customers having consumers is provided. A plurality of voice biometric engines is provided on a third-party voice authentication system remote from the institutional customers. For each institutional customer, an authentication profile is constructed having i) instructions indicating which one or more of the voice biometric engines are to be used for a corresponding of the institutional customer's consumer's enrollment or voice authentication, and ii) variables for implementing the instructions. Different values for the configurable variables may be provided for different classes of consumers for the same institutional customer. Initially, vocal information is received from a consumer, and a baseline voiceprint is constructed based on the initially received consumer vocal information. Subsequently, vocal information is received from the consumer and a temporary voiceprint is constructed based on the subsequently received vocal information. The temporary voiceprint is compared to a corresponding baseline voiceprint in accordance with an authentication profile associated with the institutional customer associated with the given consumer. Preferably, at least one of the variables in the profile is remotely configured by the institutional customer via a communication link, including at least one of the following: number of enrollment retries, verification retries, prompt sets, or threshold levels. The steps of initially and subsequently receiving vocal information steps are preferably initiated at the direction of the institutional customer.

The inventive method preferably further includes the steps of storing a plurality of the authentication profiles on a database within the system, providing at least one call processor to receive the vocal information from consumers, providing an enrollment module in communication with the call processor for collecting voice samples of the consumers from the vocal information and constructing baseline voiceprints of the voice samples, and/or providing a verification module in communication with the call processor and the enrollment module for collecting voice samples and constructing temporary voiceprints for comparison to corresponding the baseline voiceprints.

In executing the inventive method, a score is generated indicative of how similar the baseline and the temporary voiceprints are, and the score is transmitted to the institutional customer (which may or may not be upon the request of the customer).

In one aspect of the inventive method, at least one of the initial or subsequent receiving vocal information steps are performed by the institutional customer, with the inventive method further including the step of transmitting the received vocal information from the institutional customer to a central server via a data channel in an embedded audio scenario. In another, a pass-through scenario, one or both of the initial and subsequent receiving of vocal information (for enrollment and verification) do not involve the institutional customer but rather create an environment where the consumer (or other class of end user) contacts the verifying agent directly. In such a setup, the steps of initially and subsequently receiving vocal information steps may be initiated at the direction of the consumer, as opposed to the institutional customer. In any environment or scenario, these steps of initial and subsequent receiving of vocal information may include recording the vocal information for subsequent processing, or may include receiving the vocal information live in a streaming manner.

As mentioned above, conventional voice identity authentication methods typically require that additional, customized hardware be purchased, configured, and placed within the customer's own computing environment. By contrast, the inventive system is more akin to a subscription service, requiring no hardware and little software on the customer side to install, other than the capability of having the customer be able to communicate with the system. The task of identity verification is completely outsourced to the inventive system. All processing is performed within the inventive data center. This offers customers significant cost savings, while also providing them with highly secure and expert identity enrollment and verification services.

Conventional systems also are inflexible in configuration, offering essentially the same type of identity challenge to each individual. The inventive system can offer any number of biometric challenges, depending on customer need and configurable at customer request. Specifically, the inventive system can offer more than one engine, and an engine can include either static or random challenges, and offer either numeric or free-speech challenges; a combination thereof can be implemented by using more than one engine. Because the biometric engines reside wholly off-site from the customer on the inventive system's verification modules, each customer can utilize a different biometric engine, different combination of engines, and/or different types of challenges presented by each engine (and combinations thereof). In addition, because the institutional customer has remote access to the inventive system, a number of variables in the customer's profile are remotely configurable by the customer via the XML API, for example, number of enrollment retries, verification retries, prompt sets, and threshold levels. This offers significant flexibility to customers in having an authentication system tailored to meet their specific requirements. Indeed, a single customer may employ different verification requirements and tests for different categories of consumers.

BRIEF DESCRIPTION OF THE DRAWINGS

FIG. 3D is a logic flow diagram illustrating the steps of a pass-through enrollment in accordance with the invention.

DETAILED DESCRIPTION OF THE PREFERRED EMBODIMENTS

Description will now be given with reference to the attached FIGS. 1-6. It should be understood that these figures are exemplary in nature and in no way serve to limit the scope of the invention, which is defined by the claims appearing hereinbelow.

Figure 1:
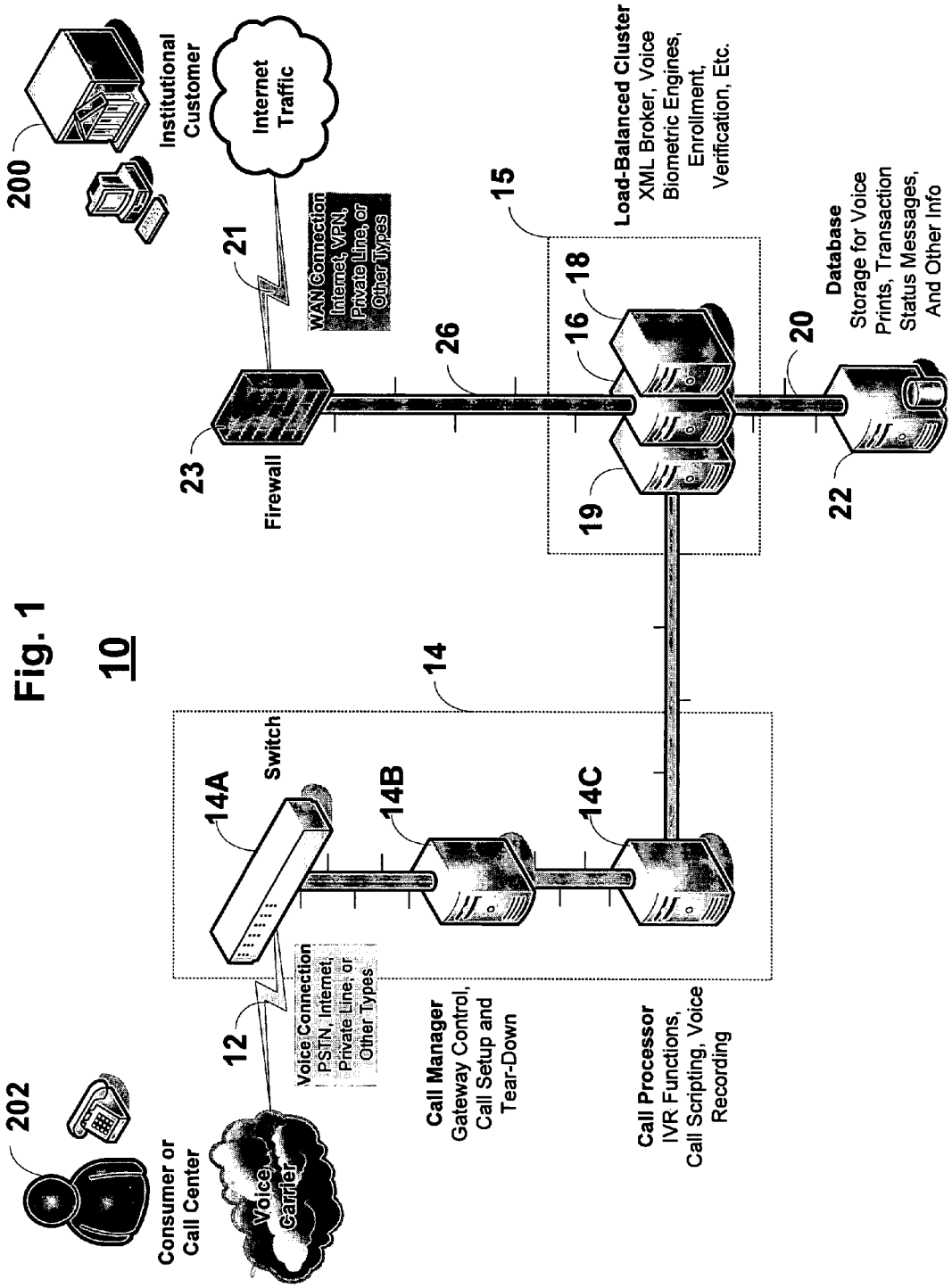
FIG. 1 is a schematic illustrating an overall system of identity authentication in accordance with the invention.
Figure 2:
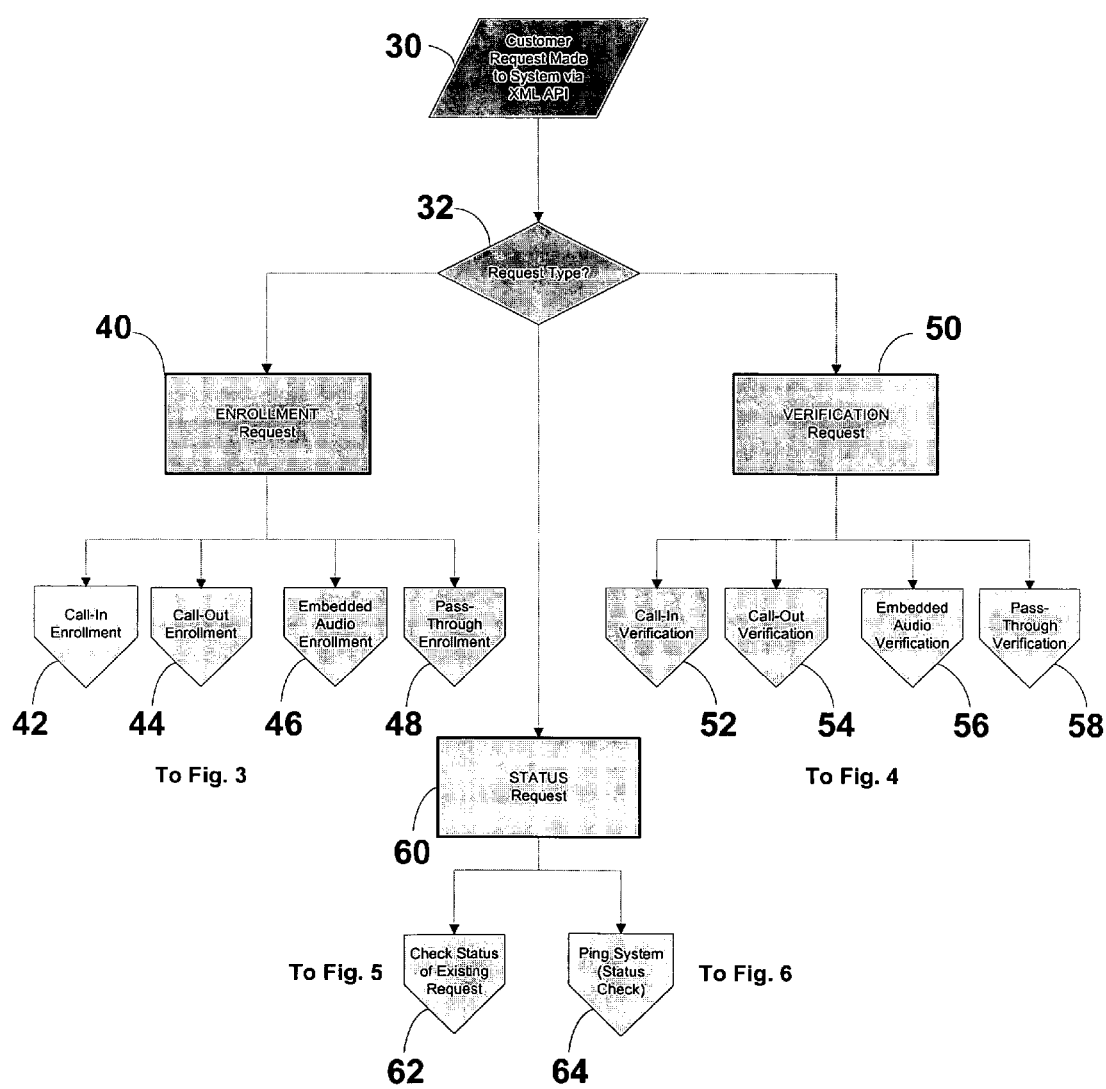
FIG. 2 is a logic flow diagram illustrating the various types of requests a customer may make of the identity authentication system in accordance with the invention.

An overview of the inventive system 10 is shown schematically in FIG. 1. The various components of the system are as follows.

Inventive system 10 is accessible by the individual consumer 202 via connection 12. Connection 12 includes any physical connection (voice or data), such as standard telephone lines, digital voice lines, wireless phones, an Internet connection, etc. One or more communications subsystems 14 are part of the system proper and include the hardware devices that route communications traffic between consumer 202 and system 10.

Subsystems 14 can be configured in any number of different ways. In the embodiment of FIG. 1, subsystem 14 includes call processor 14C, which runs typical Interactive Voice Response (IVR) functions, call scripting, voice recording, and the like. One example of a suitable call processor 14C is the IPCC Express manufactured by Cisco Systems of San Jose, Calif. Another component of subsystem 14 is call manager 14B, which provides gateway control as well as call setup and tear-down functions. A suitable call manager is the Call Manager manufactured by Cisco Systems. The subsystem also includes a switch 14A, e.g., a Cisco 6500 or 6509, having a call gateway card. Multiple subsystems 14 may be provided for a given system 10.

IVR software runs on each of these subsystems 14 (e.g., on call processor 14C). The function of the IVR software is to provide pre-recorded messages that prompt consumer 202 to enter responses (either using the keypad or their voice). The consumer responses are interpreted and the consumer is brought through system 10 accordingly—either to another component in the system or to another series of messages and prompts. Prompt sets may reside within call processors 14C or on other locations in the system.

Communication subsystems 14 connect consumers 202 to a cluster 15 of servers, preferably including enrollment server 16 and verification server 18. Enrollment server 16 includes an enrollment module having software and one or more voice biometric engines that are used to collect voice samples, process the voice samples for uniqueness, and construct voiceprints during the enrollment (or re-enrollment) process. Verification server 18 includes a preferably separate verification module having software and one or more voice biometric engines that are used to collect voice samples, process the voice samples for uniqueness, and construct temporary voiceprints. The temporary voiceprint is compared to the stored voiceprint during the verification process, and a score is returned. Prompt sets may reside on the enrollment and/or verification servers 16 and 18 instead of or in addition to communication subsystems 14.

Both servers 16 and 18 are connected via high-speed data channel 20 to database 22, a collection of physical storage devices and software that contains the baseline voiceprints and reference identifiers for the voiceprints. More specifically, database 22 stores files that are representative of the consumer baseline voiceprints. System 10 preferably does not capture (and database 22 preferably does not store) what someone says during an enrollment event. Thus, a voiceprint is not a recorded portion of a person's voice. Rather, the essence of what makes a person's speech unique when he is saying something—delay between phonemes, amplitude, pitch, frequency, etc., is captured. The stored voiceprint is actually a mathematical model or representation of how a specific person says something, not what was said. During verification, a temporary model is built from the new voice samples that are collected, and then these models are compared against one another. The scoring that takes place is analogous to "what is the probability that the same person created the enrollment sample as the verification sample?" It is not "does the verification sample match the enrollment sample?" (from a content perspective). Other support information may also be collected and stored at this point, for example, time of last enrollment, time of last verification, number of attempts needed to perform enrollment, number of failed retries, etc. These types of information may be captured on a linked subordinate information server, and would be used primarily to support customer reporting and internal performance metrics.

Institutional customers 200 typically access system 10 via a WAN connection 21, a data connection that may include the Internet, a private line, a VPN connection, etc. Customers 200 may include institutional customers such as financial institutions or an outsourced agent thereof, e.g., a third-party credit card processing and verification center. WAN connection 21 is preferably piped through firewall 23, and thence to cluster 15. Cluster 15 preferably includes a communications broker 19 that helps to evaluate inbound traffic from customers 200 and consumers 202 (via communication subsystem 14). Depending on need and availability of specific devices, load balancing services throughout the system 10 will route the request to the appropriate device. A preferred communications broker for the purposes of the inventive system is an XML broker, which may reside on its own server 19 or on either of the other servers 16 or 18. Multiple clusters 15 may be employed as needed, and/or additional servers can be individually added to the system.

Communication between customers 200 and the hardware of the system, via WAN 21 and the communications broker 19, are effectuated by an Application Program Interface (API) 26, a published software specification for use with high-level software development tools. API 26 is provided to customers 200 as a way for them to control how their business processes interact with system 10. API 26 enables customers 200 to modify their own internal software applications to interact with system 10, remotely, however and whenever they want.

API 26, preferably an XML specification, is the means by which customers 200 and system 10 communicate with each other. There are at least three levels of interaction that can be used to validate the physical customer connection. The most desirable form of interaction is the mutual certificate exchange. In this scenario, system 10 and customer 200 exchange digital certificates according to a pre-established arrangement. The next most desirable means of communication utilizes a private line with defined address range. In this scenario, a private line would be set up between customer 200 and system 10. As part of this process, an allowable range of IP addresses would be specified. Finally, a lesser desirable alternative would be IP-based. In this scenario, system 10 would be expecting a customer communication to originate from a specific IP address. In any of these cases, customer 200 can set any number of configurable variables that may be stored on database 22 as a customer profile. The configurable variables may include: selection of among specific biometric engines for given categories of customers, setting of thresholds of verification, numbers of enrollment retries, numbers of verification retries, prompt sets, etc.

Alternatively, since customer 200 may not have the requisite level of sophistication or interest to be intimately involved in the setting of verification thresholds, the entity running and maintaining system 10, the authorization service provider (ASP), may assess a customer's needs and create a customer profile on system 10 that sets up the appropriate biometric engines and variables for them. Since changing the number of biometric engines impacts enrollment time, verification time, execution speed, overall complexity, etc. the ASP may set an appropriate configuration of biometric engines and thresholds therefor. Customer 200 may still be provided access to the initially set up customer profile for adjustment-making purposes. In addition to or instead of API 26, a simpler GUI may be provided to the customer for this purpose.

In operation, the invention works as follows.

Institutional customers 200 have various business rules established that periodically require them to validate the identity of one of their own customers, consumers 202 (or similarly, their internal employees, or any other class of user). Validating one's identity first requires some form of enrollment (registration) to occur. In a typical scenario, consumer 202 is prompted to contact system by a voice link 12 to reach communication subsystem 14. Consumer 202 provides a voice sample in accordance with instructions provided by enrollment server 16 and/or IVR call processor 14C. Depending on for which customer 200 a given consumer 202 is enrolling, the enrollment process will employ one or more voice biometric engines to acquire a satisfactory sample. A file representative of the voice print sample is stored on database 22. Once a consumer is enrolled (registered) in a system, he or she can later be verified when the customer/company requires it.

As an example, a bank may want to verify the identity of a consumer who is attempting to make a retail purchase while on the Internet. In this scenario, the consumer would first have been required to initially "register" use of their credit card. Once the consumer has successfully enrolled their voice print with system 10, he will be ready for future verifications. Verification rules are configurable for each customer and are stored in system as a customer configuration file typically at database 22 or, optionally, on other locations on system 10. Multiple biometric engines are preferably employed which may offer challenges in serial (a combination), or by allowing customers to pick and choose the engines and types of challenges they want. Each engine may provide free-speech or numeric challenges, and these may be static or random, depending on the engine(s) used. The inventive system is not limited to or dependent on a particular type or types of biometric engine, and indeed, future types of voice biometric engines may be incorporated into the system without departing from the scope of the invention.

When customer 200 wants to verify the identity of the consumer 202 who, for example, is using one of its cards to make a purchase over the Internet, or accessing a 401k account or other administrative portals, a request is made to system 10 via WAN connection 21. Consumer 202 is prompted to supply a voice sample via voice link 12 (although the voice sample could also be sent as a recording via the data channel). This sample would be collected, analyzed, and compared to the "base" voice print for the consumer via the voice biometric engines residing on verification server 18. In a preferred embodiment, an overall numeric score is generated (e.g., typically scaled to a value between −999 and +999 for convenience), and then compared to a threshold value that has been established by customer 200. If values are within an allowable threshold value, a "pass" would be generated—if values cross a threshold, then a "fail" would be generated. System 10 would then return a "pass" or "fail" result to customer 200, depending on customer-supplied tolerances, as well as the actual raw score of the verification. It would then be up to customer 200 what to do, if anything, with the results it receives from system 10 (e.g., authorize/block the transaction, request additional information from the consumer, contact law enforcement, etc.).

In order to better understand the logical flow of the inventive system, description will now be given of FIGS. 2-6, the logic flow diagrams. In these diagrams, the customer initiates a request to the system via the XML API at step 30. This request takes one of three general formats: enrollment—the customer wants to enroll (or re-enroll) a consumer, based on business rules; verification—the customer wants to verify a customer's identity, based on business rules; and status—the customer wants to initiate a new request to the system, or needs to check the status of an existing request. System 10 determines which request type is being sent at step 32.

Figure 3A:
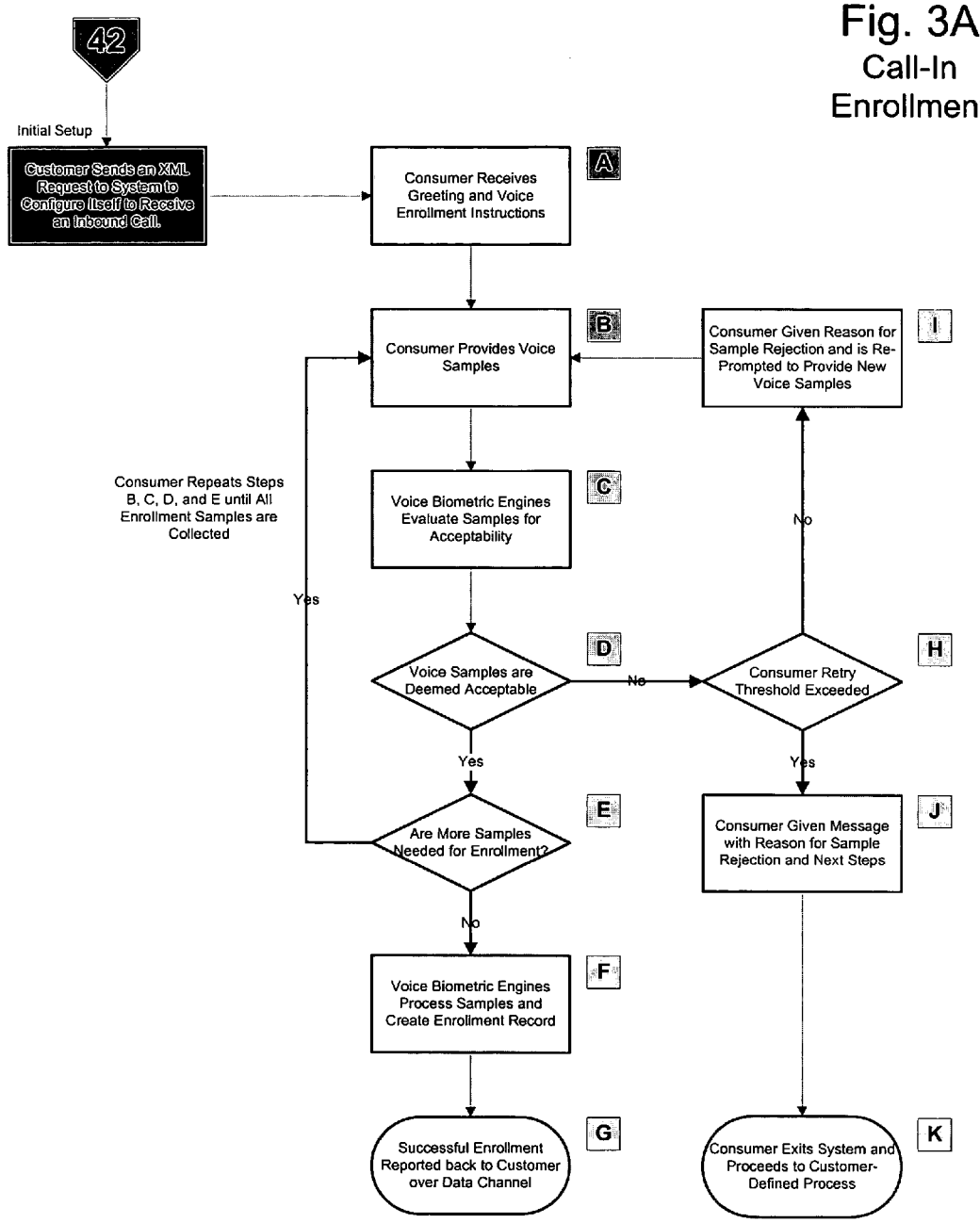
FIG. 3A is a logic flow diagram illustrating the steps of a call-in enrollment in accordance with the invention.

Within enrollment requests 40, there are four separate sub-request types, call-in enrollment at step 42 (described in FIG. 3A), call-out enrollment at step 44 (described in FIG. 3B), embedded audio enrollment at step 46 (described in FIG. 3C), and pass-through enrollment at step 48 (described in FIG. 3D).

As shown in FIG. 3A, for call-in enrollment, the consumer 202 triggers an enrollment request when his actions are evaluated by the customer's business rules and are found to require enrollment services. The customer's system makes a request to system 10 over a data channel to request a call-in enrollment event. The system configures itself to receive the call and responds to the customer's system with a unique transaction identifier that is communicated to the consumer (and that may either be referenced by the consumer, the customer, or both) along with the appropriate number for them to call. In step 42A, the consumer 202 places the call to system 10, and he receives a greeting in accordance with the specifications of customer 200. The consumer 202 is then asked to enter the unique transaction identifier, either by DTMF tones or speaking the identifier (which will be converted to a machine-readable format by way of voice recognition). In step 42B, consumer 202 is prompted to provide voice samples. For instance, the consumer may be asked to repeat a random sequence of numerals and/or word phrases. These numerals or words may be solicited either as isolated utterances or lumped together in a continuous phrase. Several iterations are required, until the voice biometric engines have enough data to evaluate the samples for acceptability. The voice biometric engines evaluate the consumer's samples to determine if they are adequate enough to create a voiceprint for the consumer in step 42C.

In step 42D, the voice samples are either deemed acceptable or unacceptable. Unacceptable samples can arise if the consumer speaks too loudly or softly (amplitude), or if there is too much noise (poor signal to noise ratio), or if he spoke to quickly or slowly, or if he failed to repeat the proper sequence of numerals. The consumer may be immediately asked to repeat unacceptable samples. If the voice biometric engines determine that the voice samples are sufficient at step 42E, they will further process the samples at step 42F and create an enrollment record. Once the enrollment record has been successfully created, system 10 plays an appropriate completion message for the consumer and writes an appropriate status message to the database. The customer can then request the status of the completed process using the XML API over the secure data channel, and the successful enrollment is reported back to the customer at step 42G.

If the consumer's initial samples were not deemed to be acceptable, then the system reads the temporary session information and determines whether or not the number of sample retries has been exceeded at step 42H. If the consumer is within the allowable number of sample retries for the session, then he will be given a system message explaining why the sample was rejected, and he will be re-prompted to provide new voice samples at step 42I. At this point, he may be returned to step 42B. If the consumer is not within the number of allowable retry attempts for sample submission, then he will be given a message as to why their sample attempts were rejected at step 42J, and he may also be given a message regarding potential next steps. Once the consumer has failed the enrollment process, system 10 plays an appropriate message for the consumer and writes an appropriate status message to the database at step 42K. The customer can then request the status of the process using the XML API over the secure data channel.

Figure 3B:
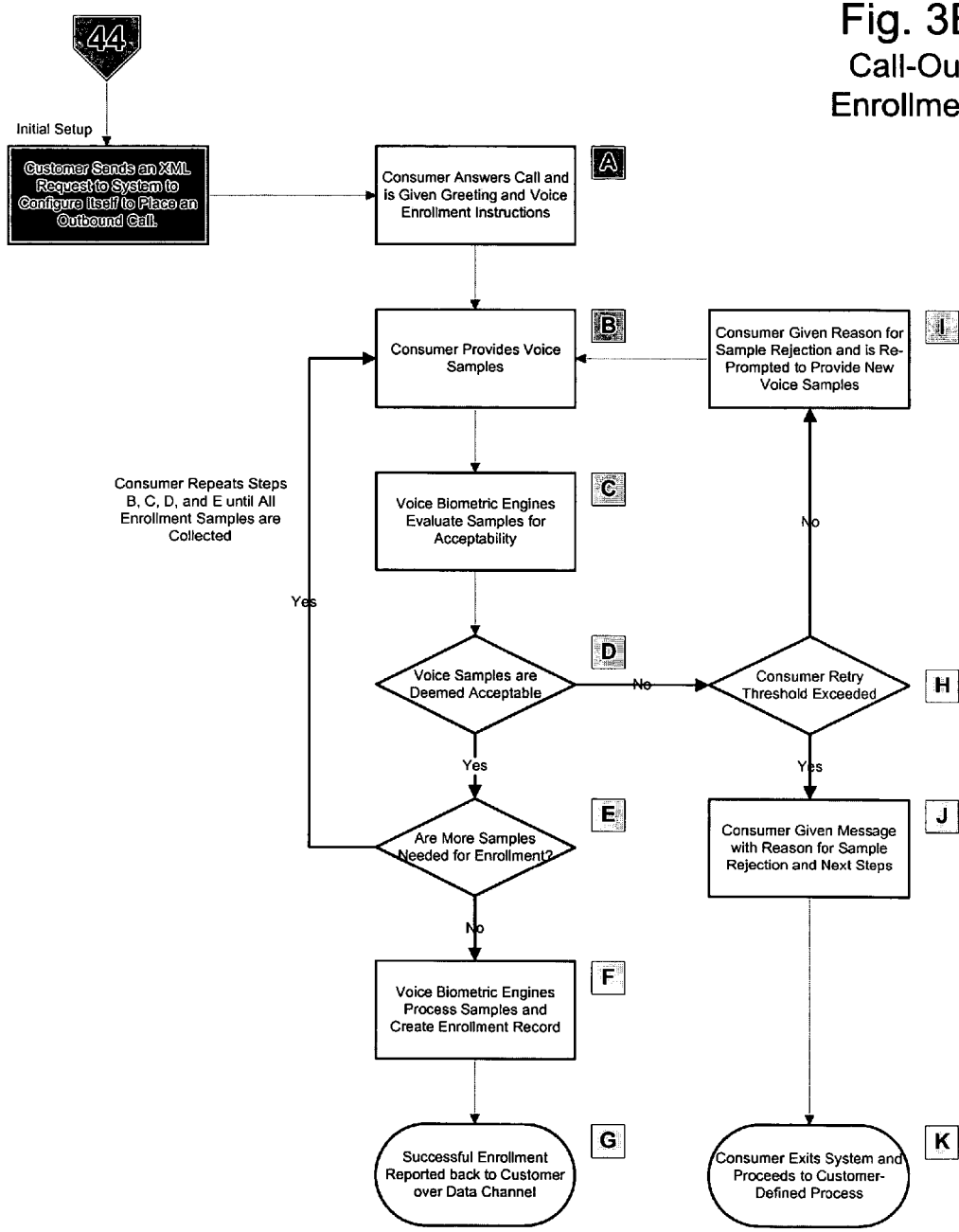
FIG. 3B is a logic flow diagram illustrating the steps of a call-out enrollment in accordance with the invention.

The logic for call-out enrollments is shown in FIG. 3B. The customer sends a call-out enrollment request to system 10 using the XML API over the secure data channel. System 10 configures itself to place an outbound call, and then creates a transaction identifier that can be referenced by the consumer or customer. An outbound call is placed by system 10 to the consumer or customer, and then system 10 handles the transaction as depicted in FIG. 3B. In step 44A, the consumer answers the call placed by system 10. Since system 10 is placing the call, there is no need to prompt the consumer for a transaction identifier. Once the consumer answers the call, the customer's enrollment greeting is played for the consumer. At step 44B, the consumer is prompted to provide voice samples. For instance, the consumer may be asked to repeat a random sequence of numerals and/or word phrases. These numerals or words may be solicited either as isolated utterances or lumped together in a continuous phrase.

The voice biometric engine evaluates the consumer's samples at step 44C to determine if they are adequate enough to create a voiceprint for the consumer. The voice samples are either deemed acceptable or unacceptable at step 44D. Unacceptable samples can arise if the consumer speaks too loudly or softly (amplitude), or if there is too much noise (poor signal to noise ratio), or if he spoke to quickly or slowly, or if he failed to repeat the proper sequence of numerals.

The voice enrollment process requires that multiple (separate) samples are collected. Thus, at step 44E, system 10 checks to make sure that enough acceptable samples have been gathered in order to proceed. If more samples are needed, the consumer is returned to step 44B in the process. If the voice biometric engine determines that the voice samples are sufficient, it will further process the samples and create an enrollment record at step 44F. Once the enrollment record has been successfully created, the system plays an appropriate completion message for the consumer and writes an appropriate status message to the database at step 44G. The customer can then request the status of the completed process using the XML API over the secure data channel.

If the consumer's initial samples were not deemed to be acceptable at step 44D, the system reads the session information and determines whether or not the number of sample retries has been exceeded at step 44H. If the consumer is within the allowable number of sample retries for the session, then he will be given a system message explaining why the sample was rejected and he will be re-prompted to provide new voice samples at step 44I. At this point, he will be returned to step 44B in the process. If it is determined at step 44H that the consumer is not within the number of allowable retry attempts for sample submission, then he will be given a message as to why his sample attempts were rejected at step 44J; he may also be given a message regarding potential next steps. Once the consumer has failed the enrollment process, system 10 plays an appropriate message for the consumer and writes an appropriate status message to the database at step 44K. The customer can then request the status of the process using the XML API over the secure data channel.

Figure 3C:
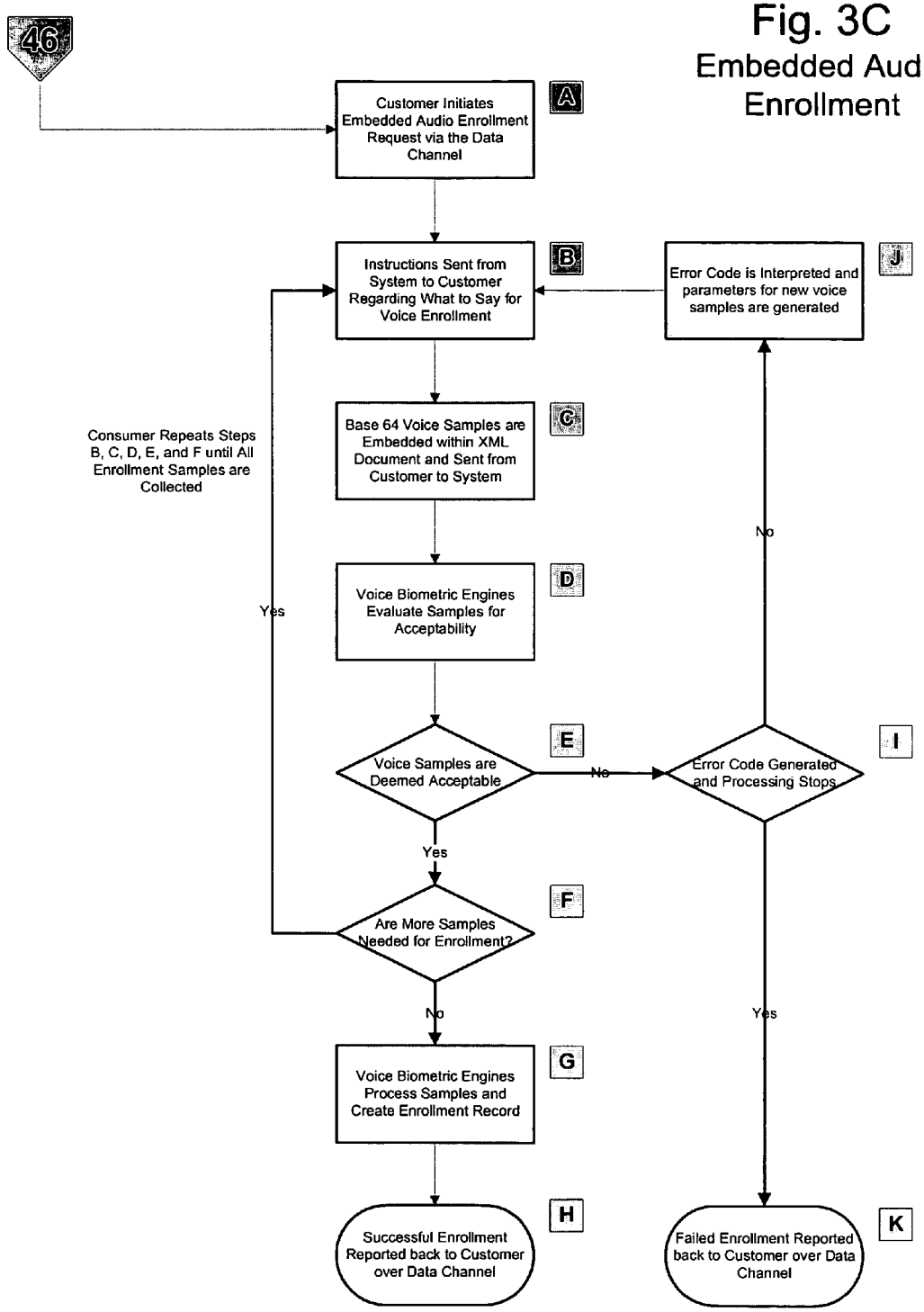
FIG. 3C is a logic flow diagram illustrating the steps of an embedded audio enrollment in accordance with the invention.

The logic flow for embedded audio enrollments is shown in FIG. 3C. In this scenario, the customer sends an embedded audio enrollment request to system 10 using the XML API over the secure data channel. System 10 configures itself to receive an XML document with embedded audio, thereby bypassing all telephony functions of the system. Thus, at no point in time does either the customer or consumer interact with system 10 using a telephone. System 10 handles the request as depicted in FIG. 3C.

The customer requests an embedded audio enrollment via the data channel in step 46A. Within this request is the unique identifier for both the customer and the consumer who will be enrolling. System 10 responds at step 46B by sending instructions back to the customer (via the data channel) for what must be included in the embedded audio sample. The customer records the consumer (as requested) and sends an embedded audio sample of the consumer's voice to system 10 within an XML document at step 46C. This sample of embedded audio is preferably encoded in standard Base64 format or the like.

The voice biometric engine evaluates the embedded audio sample at step 46D to determine if it is adequate enough to help create a voiceprint for the consumer. The voice sample is either deemed acceptable or unacceptable at step 46E. Unacceptable samples can arise if the consumer's voice sample is too loudly or too soft (amplitude), or if there is too much noise (poor signal to noise ratio), or if the sample was spoken too quickly or slowly, or if the sample recording does not match what was requested (content).

If the samples are acceptable, the voice biometric engine determines, at step 46F, whether or not more samples are required in order to create a voiceprint. If more samples are required, then system 10 resets the process and returns to step 46B. Here, instructions are sent back to the customer over the data channel for what should be included in the next embedded audio sample that is sent. Once the voice biometric engine has captured sufficient samples to create an enrollment record, the enrollment record is created at step 46G. Following the successful creation of the enrollment record, system 10 writes an appropriate status message to the database at step 46H. At that point, system processing terminates and any additional processing continues within the customer's system according to their own business rules.

If the embedded audio sample was not deemed to be acceptable, then system 10 generates an error code and evaluates what to do next at step 46I. At this point, the nature of the error and number of previous retry attempts will be considered. If the error code is evaluated and it has been determined that another sample should be solicited, then the system generates parameters for new voice samples at step 46J and resets the process and returns to step 46B. Here, instructions are sent back to the customer over the data channel for what should be included in the next embedded audio sample. If the error code indicates that another sample should not be solicited from the customer, then an enrollment failure message is generated and written to the database at step 46K. At that point, processing terminates and any additional processing continues within the customer's system according to their own business rules.

The above steps depict one possible use of embedded audio within the inventive system. The inventive system allows multiple ways to implement embedded audio procedures. For instance, all prompting and sample collection could be performed on a client system (using a plug-in), and then the resulting voice templates could be sent to the system. Other variations are possible.

The logic for pass-through enrollments is shown in FIG. 3D. The consumer calls a particular number that was pre-assigned to him by the customer. A DNIS (digital number identification system) is used to match the number called to a particular customer—specifically for the purposes of call-in based enrollments. Thus, in step 48A, system 10 answers the call and prompts the consumer to say or enter his unique ID number using DTMF tones. System 10 then further matches the unique consumer id that was spoken or entered to determine if the user is authorized to continue. Upon successful verification of this information, the customer's enrollment greeting is played for the consumer. If the unique consumer ID is not matched, then are returned to step 48A and asked to re-enter their ID. At step 48C, the consumer is prompted to provide voice samples. For instance, the consumer may be asked to repeat a random sequence of numerals and/word phrases. These numerals or words may be solicited either as isolated utterances or lumped together in a continuous phrase.

The voice biometric engine evaluates the consumer's samples at step 48D to determine if they are adequate enough to create a voiceprint for the consumer. The voice samples are either deemed acceptable or unacceptable at step 48E. Unacceptable samples can arise if the consumer speaks too loudly or softly (amplitude), or if there is too much noise (poor signal to noise ratio), or if he spoke to quickly or slowly, or if he failed to repeat the proper sequence of numerals.

The voice enrollment process requires that multiple (separate) samples are collected. Thus, at step 48F, system 10 checks to make sure that enough acceptable samples have been gathered in order to proceed. If more samples are needed, the consumer is returned to step 48C in the process. If the voice biometric engine determines that the voice samples are sufficient, it will further process the samples and create an enrollment record at step 48G. Once the enrollment record has been successfully created, the system plays an appropriate completion message for the consumer and writes an appropriate status message to the database at step 48H. The customer can then request the status of the completed process using the XML API over the secure data channel, or optionally "pass through" (post) a message to a pre-determined customer system/process over the secure data channel. The call is then terminated.

If the consumer's initial samples were not deemed to be acceptable at step 48E, the system reads the session information and determines whether or not the number of sample retries has been exceeded at step 48I. If the consumer is within the allowable number of sample retries for the session, then he will be given a system message explaining why the sample was rejected and he will be re-prompted to provide new voice samples at step 48J. At this point, he will be returned to step 48C in the process. If it is determined at step 48I that the consumer is not within the number of allowable retry attempts for sample submission, then he will be given a message as to why his sample attempts were rejected at step 48K; he may also be given a message regarding potential next steps. Once the consumer has failed the enrollment process, system 10 plays an appropriate message for the consumer and writes an appropriate status message to the database at step 48L. The customer can then request the status of the process using the XML API over the secure data channel.

Figure 4A:
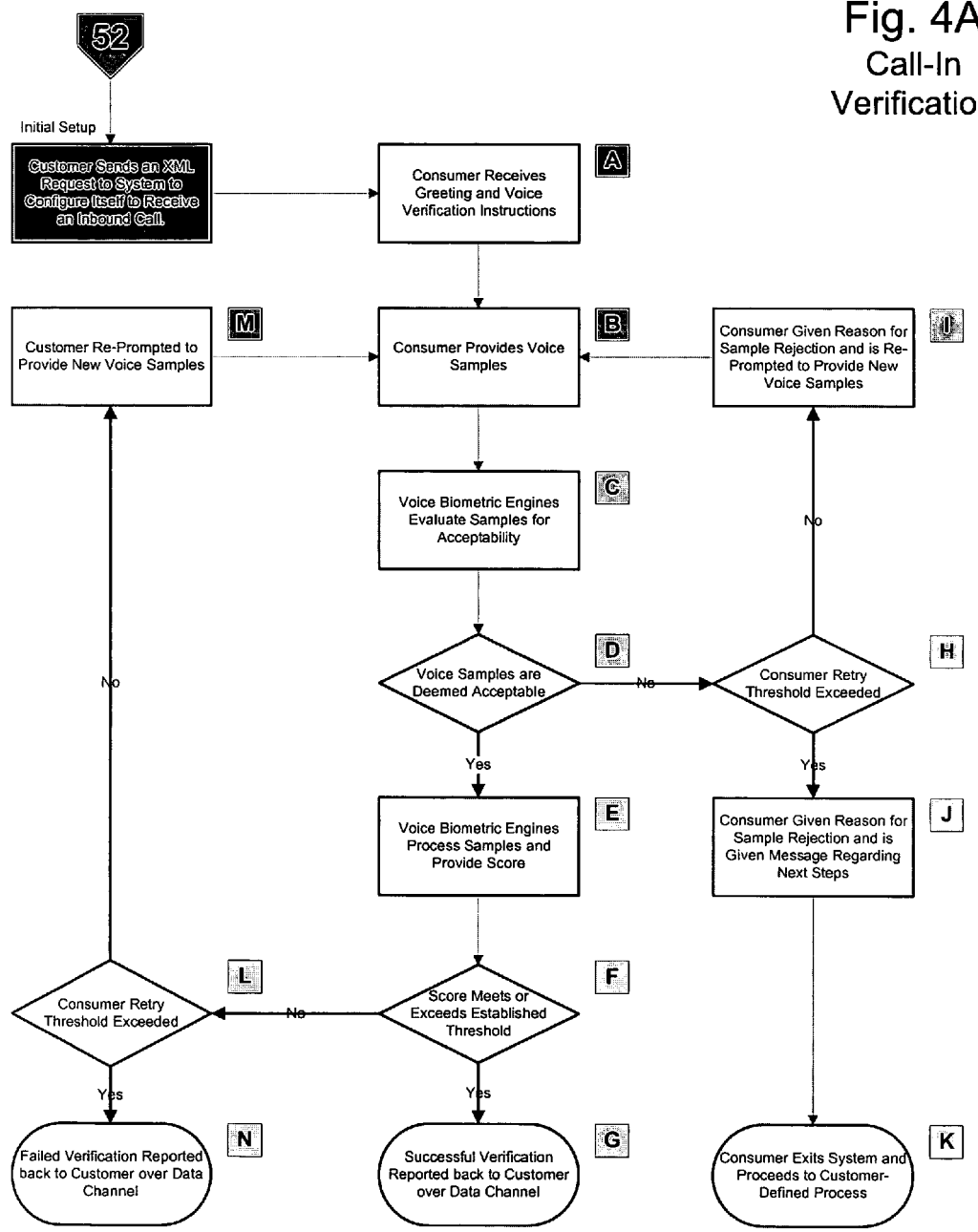
FIG. 4A is a logic flow diagram illustrating the steps of a call-in verification in accordance with the invention.
Figure 4B:
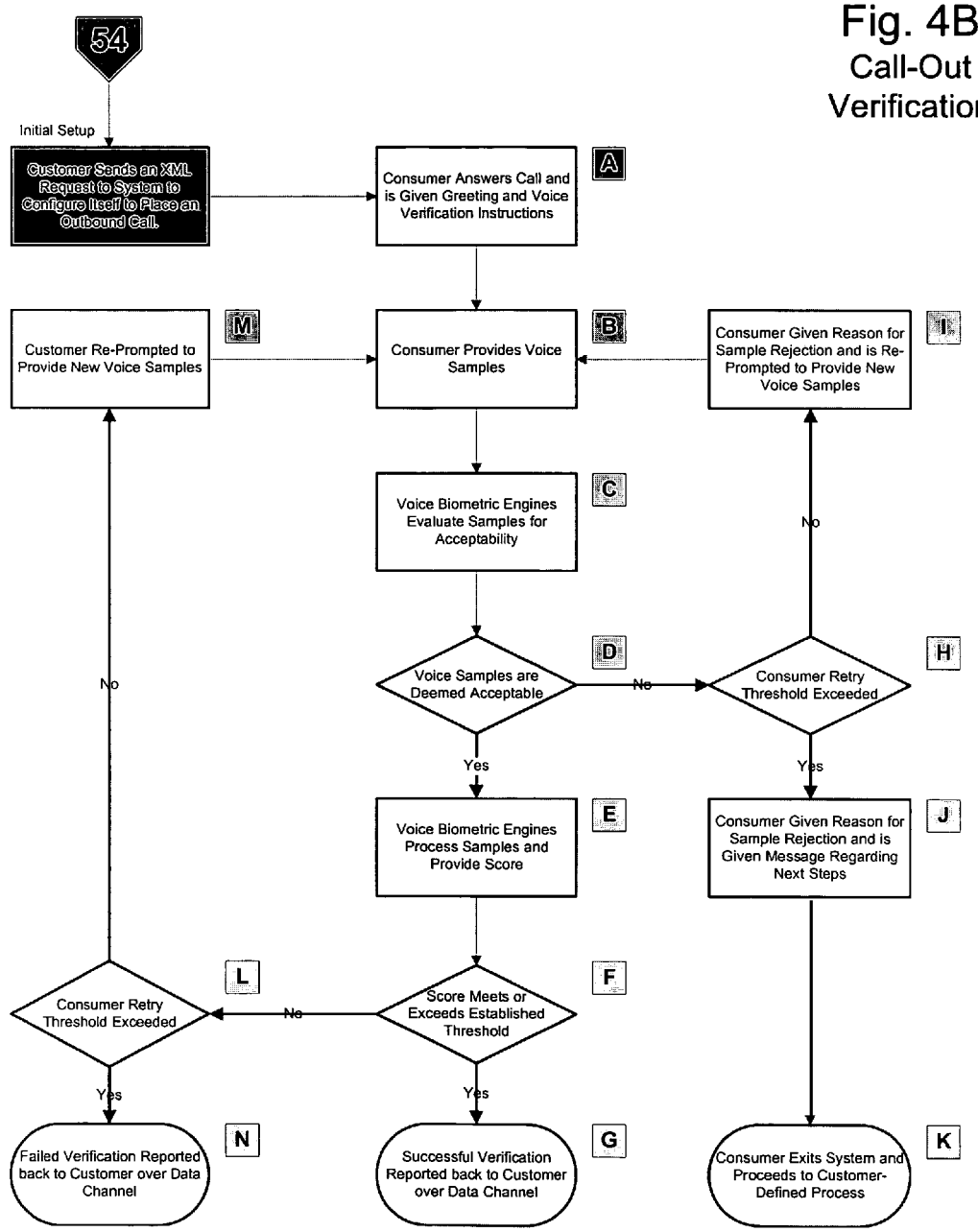
FIG. 4B is a logic flow diagram illustrating the steps of a call-out verification in accordance with the invention.
Figure 4C:
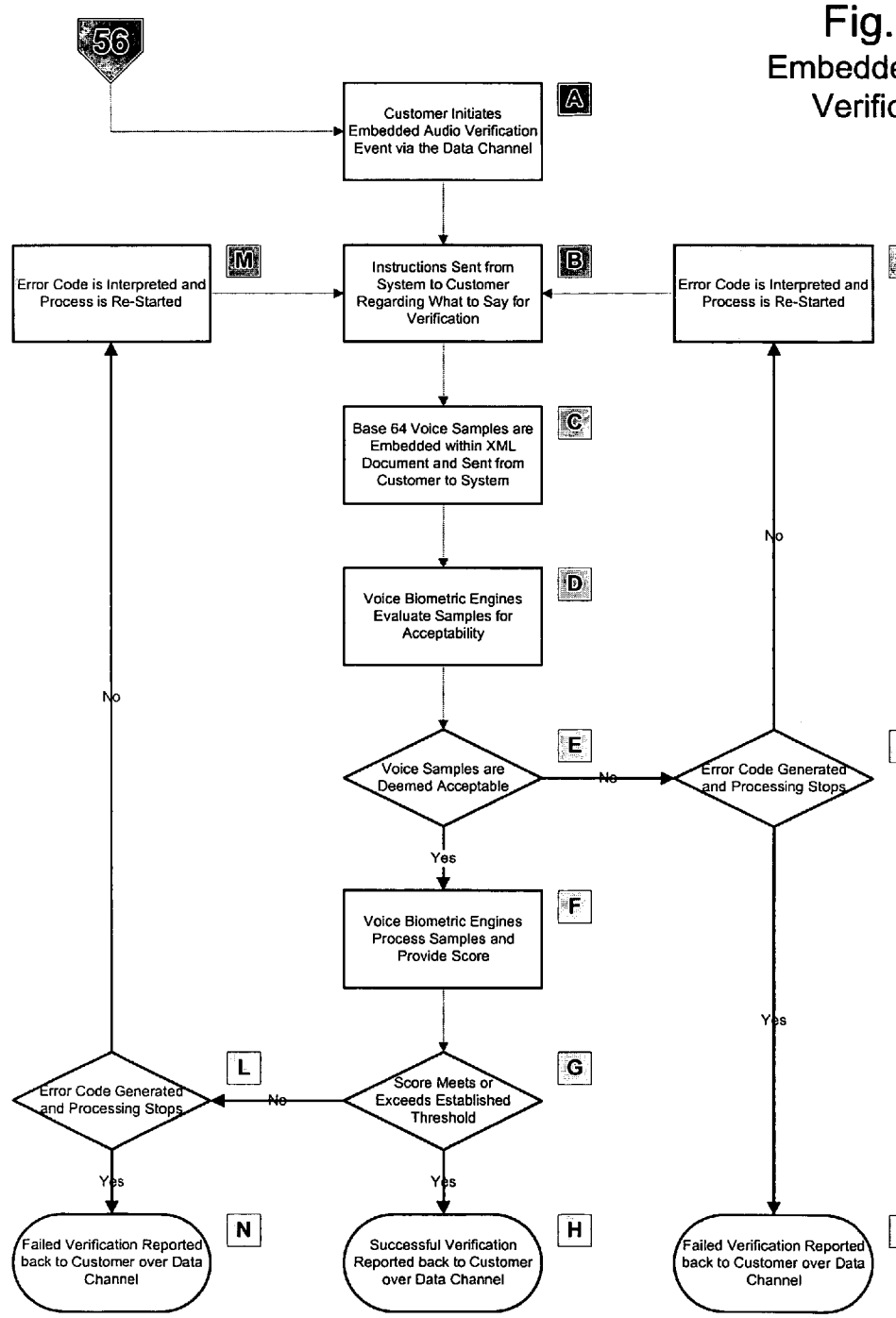
FIG. 4C is a logic flow diagram illustrating the steps of an embedded audio verification in accordance with the invention.
Figure 4D:
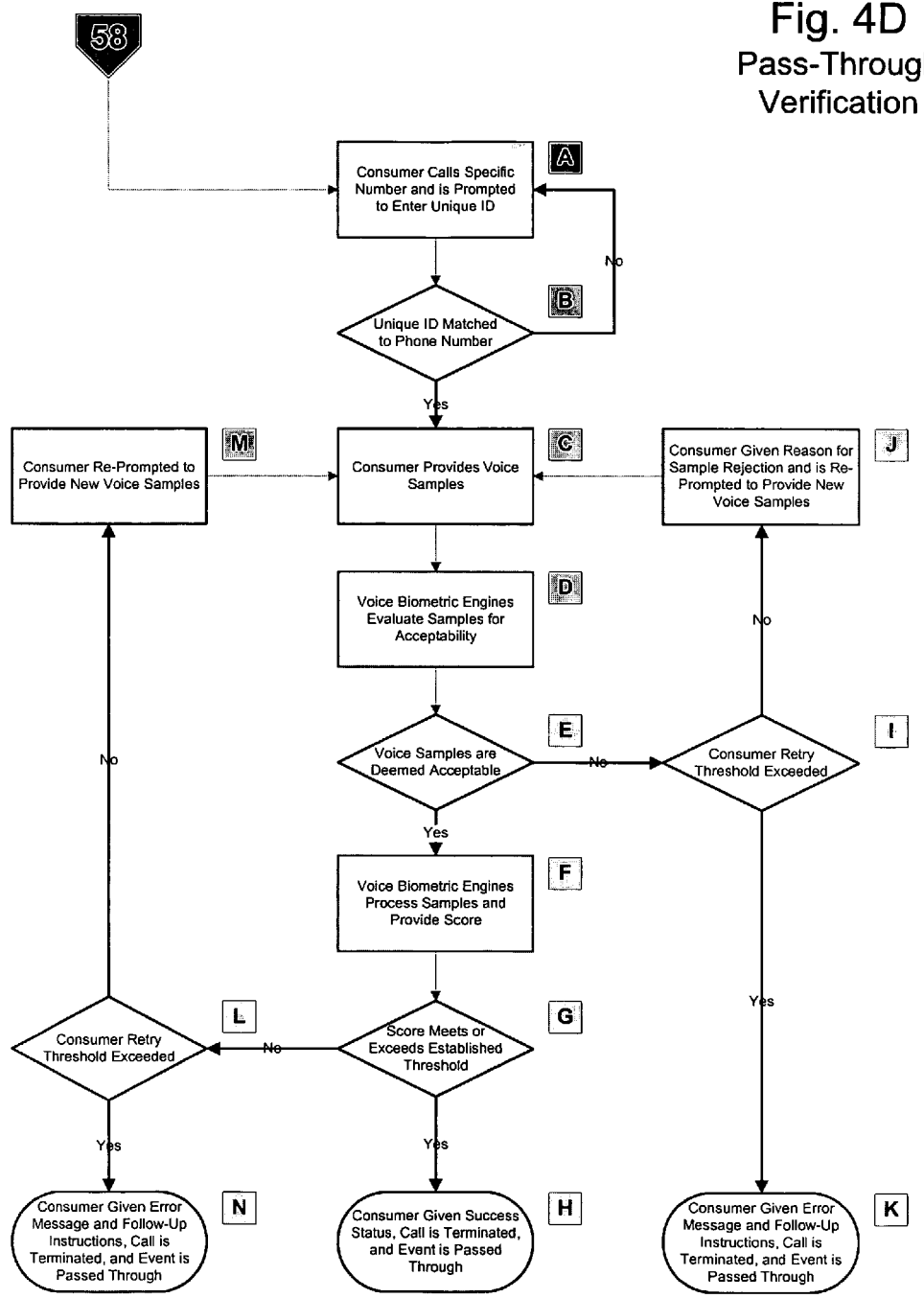
FIG. 4D is a logic flow diagram illustrating the steps of a pass-through verification in accordance with the invention.

If it is determined at step 32 that the request is a verification request, the logic flow from step 50 determines which type of verification request is being submitted: call-in verification at step 52 (described in FIG. 4A), call-out verification 54 (described in FIG. 4B), embedded audio verification 56 (described in FIG. 4C), or pass-through verification 58 (described in FIG. 4D).

As shown in FIG. 4A, for call-in verification, the customer sends a call-in verification request to system 10 using the XML API over the secure data channel. The system configures itself to receive an inbound call, and then creates a transaction identifier that can be referenced by the consumer or customer. An inbound call is placed by the consumer or customer, and then the system handles the transaction as depicted in FIG. 4A.

The inbound call is answered by the system. A standard greeting is played at step 52A where the consumer is asked to enter the unique transaction identifier, either by DTMF tones or speaking the identifier (which will be converted to a machine-readable format by way of voice recognition). Once the correct identifier has been provided, the customer's verification greeting is played for the consumer. The consumer is prompted to provide voice samples at step 52B. For instance, the consumer may be asked to repeat a random sequence of numerals and/or word phrases. These numerals or words may be solicited either as isolated utterances or lumped together in a continuous phrase.

The voice biometric engine evaluates the consumer's samples at step 52C to determine if they are adequate enough to create a voiceprint for the consumer. The voice samples are either deemed acceptable or unacceptable at step 52D. Unacceptable samples can arise if the consumer speaks too loudly or softly (amplitude), or if there is too much noise (poor signal to noise ratio), or if they spoke to quickly or slowly, or if they failed to repeat the proper sequence of numerals. If the voice biometric engine determines that the voice samples are sufficient, it will further process the samples at step 52E into a temporary voiceprint record, compare it to the stored voiceprint record for the consumer, and provide a score. The returned score is evaluated against the customer's threshold value at step 52F to determine if it meets or exceeds the minimum acceptable score. This threshold score may depend on the identity of the consumer or to which classifications the consumer belongs. If the score is determined to be successful, system 10 plays an appropriate completion message for the consumer and writes an appropriate status message to the database at step 52G. The customer can then request the status of the completed process using the XML API over the secure data channel. At this point, the customer's business logic takes over and processing continues. For example, a successful score may trigger a credit card authorization number to be generated and sent to a retailer.

If the consumer's initial samples were not deemed to be acceptable at step 52D, the system reads the session information and determines whether or not the number of sample retries has been exceeded at step 52H. If the consumer is within the allowable number of sample retries for the session, then at step 52I he will be given a system message explaining why the sample was rejected, and he will be re-prompted to provide new voice samples. At this point, he may be returned to step 52B in the process. If the consumer is not within the number of allowable retry attempts for sample submission, then he will be given a message as to why his sample was rejected at step 52J, and he may also be given a message regarding potential next steps. Once the consumer has failed the verification process, system 10 plays an appropriate message for the consumer and writes an appropriate status message to the database at step 52K. The customer can then request the status of the process using the XML API over the secure data channel.

If the consumer provides a good sample, but fails to achieve an acceptable score (i.e. "to pass") at step 52F, then business rules are evaluated at step 52L to determine if the consumer can try again to be verified. If the consumer is allowed to try again to be verified, he may be given an additional message and are re-prompted to provide a new set of voice samples at step 52M. At this point, he will be returned to step 52B in the process. If the consumer has a failed score and is not allowed to continue due to exceeded retries, then system 10 plays an appropriate completion message for the consumer and writes an appropriate status message to the database at step 52N. The customer can then request the status of the completed process using the XML API over the secure data channel. At this point, the customer's business logic takes over and processing optionally continues.

The logic for call-out verifications is shown in FIG. 4B. In this scenario, the customer sends a call-out verification request to the system using the XML API over the secure data channel. The system configures itself to place an outbound call, and then creates a transaction identifier that can be referenced by the consumer or customer. An outbound call is placed by the system to the consumer or customer, and then the system handles the transaction as depicted in FIG. 4B.

The consumer answers the call placed by system 10 at step 54A. Since system 10 is placing the call, there is no need to prompt the consumer for a transaction ID. Once the consumer answers the call, the customer's verification greeting is played for the consumer. At step 54B, the consumer is prompted to provide voice samples. For instance, the consumer may be asked to repeat a random sequence of numerals and/or word phrases. These numerals or words may be solicited either as isolated utterances or lumped together in a continuous phrase.

The voice biometric engine evaluates the consumer's samples to determine if they are adequate enough to create a voiceprint for the consumer at step 54C. The voice samples are either deemed acceptable or unacceptable at step 54D. Unacceptable samples can arise if the consumer speaks too loudly or softly (amplitude), or if there is too much noise (poor signal to noise ratio), or if they spoke to quickly or slowly, or if they failed to repeat the proper sequence of numerals. If the voice biometric engine determines that the voice samples are sufficient, it will further process the samples at step 54E into a temporary voiceprint record and will compare it to the stored voiceprint record for the consumer and provides a score. The returned score is evaluated against the customer's threshold value at step 54F to determine if it meets or exceeds the minimum acceptable score. This threshold score may depend on the identity of the consumer. If the score is determined to be successful, system 10 plays an appropriate completion message for the consumer and writes an appropriate status message to the database at step 54G. The customer can then request the status of the completed process using the XML API over the secure data channel. At this point, the customer's business logic takes over and processing continues. For example, a successful score may trigger an online purchase to be authorized by the card-issuing bank.

If the consumer's initial samples were not deemed to be acceptable at step 54D, the system reads the session information and determines whether or not the number of sample retries has been exceeded at step 54H. If the consumer is within the allowable number of sample retries for the session, then they will be given a system message explaining why the sample was rejected at step 54I, and they will be re-prompted to provide new voice samples. At this point, they may be returned to step 54B in the process. If the consumer is not within the number of allowable retry attempts for sample submission, then they will be given a message as to why their sample was rejected at step 54J, and they may also be given a message regarding potential next steps. Once the consumer has failed the verification process, the system plays an appropriate message for the consumer and writes an appropriate status message to the database at step 54K. The customer can then request the status of the process using the XML API over the secure data channel.

If it was determined that the consumer provides a good sample at step 54D, but fails to achieve an acceptable score (i.e. "to pass") at step 54F, then business rules are evaluated to determine if the consumer can try again to be verified at step 54L. If the consumer is allowed to try again to be verified, they may be given an additional message at step 54M and are re-prompted to provide a new set of voice samples. At this point, they will be returned to step 54B in the process. If the consumer has a failed score and is not allowed to continue due to exceeded retries, then system 10 plays an appropriate completion message for the consumer and writes an appropriate status message to the database at step 54N. The customer can then request the status of the completed process using the XML API over the secure data channel. At this point, the customer's business logic takes over and processing optionally continues.

Another verification scenario involves embedded audio verification as described in FIG. 4C. In this scenario, the customer sends an embedded audio verification request to system 10 using the XML API over the secure data channel. The system configures itself to receive an XML document with embedded audio, thereby bypassing all telephony functions of the system. Thus, at no point in time does either the customer or consumer interact with system 10 using a telephone. System 10 handles the transaction as depicted in FIG. 4C.

The customer requests an embedded audio verification via the data channel at step 56A. Within this request is the unique identifier for both the customer and the consumer who will be verified. System 10 responds by sending instructions back to the customer (via the data channel) for what must be included in the embedded audio sample at step 56B. The customer records the consumer (as requested) and sends an embedded audio sample of the consumer's voice to system 10 within an XML document at step 56C. This sample of embedded audio is preferably encoded in standard Base64 format.

The voice biometric engine evaluates the embedded audio sample to determine if it is adequate enough to help create a comparative voiceprint for the consumer at step 56D. The voice sample is either deemed acceptable or unacceptable. Unacceptable samples can arise if the consumer's voice sample is too loudly or too soft (amplitude), or if there is too much noise (poor signal to noise ratio), or if the sample was spoken too quickly or slowly, or if the sample recording does not match what was requested (content).

If the voice biometric engine determines that the embedded audio samples are sufficient, it will further process the samples into a temporary voiceprint record and will compare it to the stored voiceprint record for the consumer at step 56F. A matching score will be generated. At step 56G, the returned score is evaluated against the customer's threshold value to determine if it meets or exceeds the minimum acceptable score. This threshold score may depend on the identity of the consumer. If the score is determined to be successful, system 10 writes an appropriate status message to the database at step 56H. The customer can then request the status of the completed process using the XML API over the secure data channel. At this point, the customer's business logic takes over and processing continues. For example, a successful score may allow a user to proceed further within a call center or telephone banking menu system.

If, at step 56E, the embedded audio sample was not deemed to be acceptable, then system 10 generates an error code at step 56I and evaluates what to do next. At this point, the nature of the error and number of previous retry attempts will be considered. If the error code is evaluated and it has been determined that another sample should be solicited at step 56J, then the system resets the process and returns to step 56B. Here, instructions are sent back to the customer over the data channel for what should be included in the next embedded audio sample. If instead the error code indicates that another sample should not be solicited from the customer, then a verification failure message is generated and written to the database at step 56K. At that point, processing terminates and any additional processing continues within the customer's system according to their own business rules.

If the embedded audio sample has been determined to be "good" at step 56E but fails to achieve an acceptable score (i.e. "to pass") at step 56G, then business rules are evaluated to determine if another embedded audio sample should be solicited at step 56L. At this point, prior retry attempts will also be considered. If the error code is evaluated and it has been determined that another sample should be solicited at step 56M, then the system resets the process and returns to step 56B. Here, instructions are sent back to the customer over the data channel for what should be included in the next embedded audio sample. If the consumer has a failed score and is not allowed to continue due to exceeded retries, then system 10 generates an appropriate error message and writes it to the database at step 56N. The customer can then request the status of the completed process using the XML API over the secure data channel. At this point, the customer's business logic takes over and processing optionally continues.

The pass-through verification method is a special-case method that does not use any inbound XML API calls from customers. The verification event is initiated by an inbound consumer telephone call, and subsequent status messages are optionally posted to external customer systems. The basic logic of this method is as depicted in FIG. 4D.

The consumer places an inbound call to system 10 at step 58A, using a specific number assigned to him or programmed into the telephone they will be using. An encoding system such as DNIS is used to identify the inbound call as being a pass-through verification request for a specific customer. The consumer will receive a short prompt requesting him to speak or type in his ID number using the telephone keypad. The DTMF tones are converted for use by the system control software, and the consumer's ID number is tested against stored (valid) ID numbers for the specific phone number that was called at step 58B. If matched, the consumer can proceed to step 58C. If a match is not found, the consumer is sent back to step 58A and asked to start over.

The consumer is prompted to provide voice samples at step 58C. For instance, the consumer may be asked to repeat a random sequence of numerals and/or word phrases. These numerals or words may be solicited either as isolated utterances or lumped together in a continuous phrase. One utterance may suffice or several iterations may be required, until the voice biometric engine has enough data to evaluate the samples for acceptability.

The voice biometric engine evaluates the consumer's samples to determine if they are adequate enough to create a voiceprint for the consumer at step 58D. The voice samples are either deemed acceptable or unacceptable at step 58E. Unacceptable samples can arise if the consumer speaks too loudly or softly (amplitude), or if there is too much noise (poor signal to noise ratio), or if they spoke to quickly or slowly, or if they failed to repeat the proper sequence of numerals.

If the voice biometric engine determines that the voice samples are sufficient, it will further process the samples into a temporary voiceprint record and will compare it to the stored voiceprint record for the consumer and provides a score at step 58F. The returned score is evaluated against the customer's threshold value to determine if it meets or exceeds the minimum acceptable score at step 58G. This threshold score may depend on the identity of the consumer. If the score is determined to be successful, system 10 plays an appropriate message for the consumer, writes an appropriate status message to the database, and optionally "passes through" (posts) a message to a pre-determined customer system/process over the secure data channel at step 58H. The call is then terminated.

If the consumer's initial samples were not deemed to be acceptable at step 58E, then the system reads the temporary session information and determines whether or not the number of sample retries has been exceeded at step 58I. If the consumer is within the allowable number of sample retries for the session, then they will be given a system message explaining why the sample was rejected and they will be re-prompted to provide new voice samples at step 58J. At this point, they are returned to step 58C in the process. If the consumer is not within the number of allowable retry attempts for sample submission, then they will be given an error message, event status information will be written to the database, and an appropriate message will be posted to a pre-determined customer system/process over the data channel at step 58K. The call is then terminated. As an option, the consumer may be given a menu option so that typing a key on their telephone keypad will connect them to a live operator.

If the consumer's sample is deemed to be good at step 58E but fails to achieve an acceptable score (i.e. "to pass") at step 58G, then business rules are evaluated at step 58L to determine if the consumer can try again to be verified. If the consumer is allowed to try again to be verified, they may be given an additional message and are re-prompted to provide a new set of voice samples at step 58M. At this point, they will be returned to step 58C in the process. If the consumer is not within the number of allowable retry attempts for verification testing, then they will be given an error message, event status information will be written to the database, and an appropriate message will optionally be posted to a pre-determined customer system/process over the data channel at step 58N. The call is then terminated. As an option, the consumer may be given a menu option so that typing a key on their telephone keypad will connect them to a live operator.

Each of the above scenarios offers an advantage over what is conventionally available in the field. For example, the embedded audio methods (FIGS. 3C and 4C) provide a distinct advantage, as call centers are able to embed audio and transmit voice recordings to the system, as opposed to connecting to the system via a phone link and providing live speech. There are considerable costs associated with using the public switched telephone network to setup and tear down a call; therefore using a purely internet-based method such as the embedded audio enrollment and verification methods outlined above offer substantial cost savings.

The pass-through methods provide a way for the consumer to initiate verification without the need to include the customer. This provides a major advantage with respect to remote "time and attendance" scenarios. For example, visiting nurses could be required to "clock out" when they are finished visiting someone's home. A required phone call from the residence could be time/date stamped, caller-ID verified, and the identity of the healthcare provider can be authenticated by voice to confirm that the provider was actually on premise. Major problems such as fraud and "buddy punching" can be avoided.

The call-out verification scenario (FIG. 4B) may include an optional text-to-speech parameter. So, not only can a credit card company perform a call-out verification to the consumer, but the consumer could optionally be given a way to approve the transaction remotely. As an example, if one were to take a number of clients to a restaurant and were about to put $5000 on a credit card, a call-out might say "authorize $5000 at restaurant? . . . press 1 to voice verify and press 2 to decline." The system thereby obviates (or minimizes the role of) a customer service representative calling to verify the transaction by asking personal information which may be compromised. Instead, the prompt will automatically connect the consumer to the verification algorithm, whereupon his voice will be authenticated.

A third functional request category deals with status issues. In status requests 60 (FIG. 2), the customer wants to initiate a new request to the system, or needs to check the status of an existing request. Within status requests 60, there are two separate sub-request types, check status 62 (FIG. 5) and ping 64 (FIG. 6).

Figure 6:
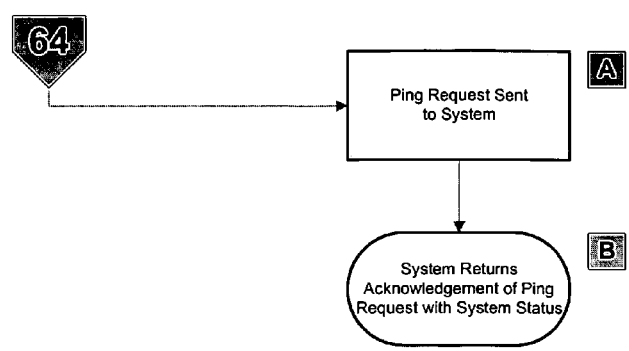
FIG. 6 is a logic flow diagram illustrating the steps of a ping request in accordance with the invention.

As shown in FIG. 6, when customer 200 "pings" system 10, the customer is looking to initiate a new request to the system. In this case, customer 200 sends a ping to system 10 at step 64, and then the system returns with an acknowledgment or "ready" status at step 64B. The customer system would then respond by sending back a request for an enrollment or verification as discussed above.

Figure 5:
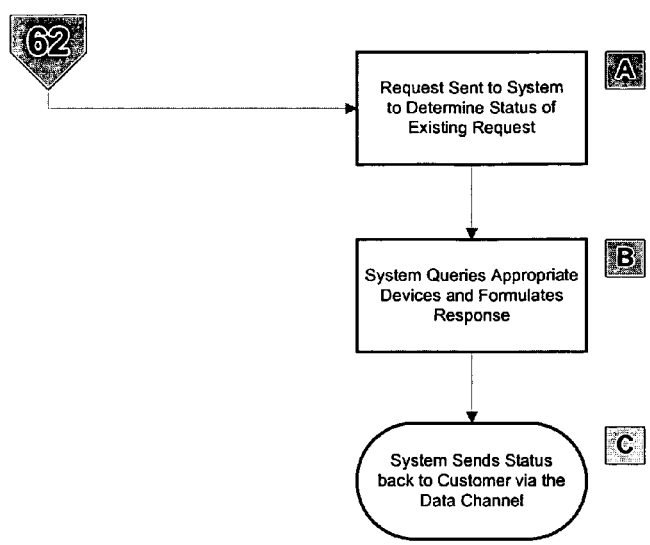
FIG. 5 is a logic flow diagram illustrating the steps of a status check in accordance with the invention.

Another type of request is related to status checks. With the exception of the pass-through enrollment and verifications method of FIGS. 3D and 4D, system 10 responds to specific client requests submitted via the XML API over the secure data channel. The inventive system is passive by design, so customer systems and processes must request a status for all active processes. To request the status of a transaction, the customer system must provide a client identifier, a customer identifier, and a transaction identifier. Processing occurs as depicted in FIG. 5.

The customer sends a request to system 10 using the XML API at step 62A. The request includes the customer identifier, client identifier, and specific transaction identifier of the process for which the customer wishes to know the status. The system queries the database and appropriate system devices to determine the status of the requested process at step 62B. At step 62C, the status of the requested process is sent back to the customer via the XML API over the secure data channel.

Having described the invention with reference to specific embodiments delineated above, it should be understood that the invention is not limited thereto, nor to the embodiments shown in the appended drawings. Rather, the scope of the invention is defined by the claims appearing hereinbelow and their reasonable equivalents.

What is claimed is:

1. A system of providing to institutional customers third-party voice authentication of consumers of the institutional customers, comprising:

a first communication link, accessible by the consumers;
software associated with said first communication link that prompts the consumers to enter vocal responses;
at least one centralized server in communication with said first communication link;
an enrollment module on said at least one centralized server in communication with said first communication link for collecting voice samples of the consumers from said prompted vocal responses and constructing baseline voiceprints of said voice samples;
a verification module on said at least one centralized server in communication with said first communication link and said enrollment module for collecting voice samples and constructing temporary voiceprints for comparison to corresponding said baseline voiceprints;
a plurality of voice biometric engines residing on said system and accessible by said verification module for determining how similar a given temporary voiceprint is to one of said baseline voiceprints;
for each of the institutional customers, a profile residing on said system having instructions indicating which one or more of said voice biometric engines are to be used for a corresponding consumer's enrollment or voice authentication and variables for implementing said instructions; and
a second communication link between said system and the institutional customers,
wherein if one of said temporary voiceprints is determined to be sufficiently close to a corresponding of said baseline voiceprints by at least one of said voice biometric engines in accordance with a corresponding said profile, the consumer is authenticated.

2. A system of providing third-party voice authentication according to claim 1, wherein at least one of the variables in said profile is remotely configurable by the institutional customer via said second communication link.

3. A system of providing third-party voice authentication according to claim 2, wherein said second communication link comprises an application program interface (API).

4. A system of providing third-party voice authentication according to claim 2, wherein said variables in said profile that are remotely configurable by the institutional customer via said second communication link include at least one of the following: number of enrollment retries, verification retries, prompt sets, or threshold levels.

5. A system of providing third-party voice authentication according to claim 1, wherein said first communication link is accessible by the consumers at the direction of the institutional customers.

6. A system of providing third-party voice authentication according to claim 1, further comprising a database upon which said baseline voiceprints are stored.

7. A system of providing third-party voice authentication according to claim 1, wherein said first communication link comprises at least one call processor.

8. A system of providing third-party voice authentication according to claim 1, wherein said voice biometric engines reside on one or both of said modules.

9. A system of providing third-party voice authentication according to claim 8, said voice biometric engines further comprising:
   at least one enrollment engine resident on said enrollment module; and
   at least one verification engine resident on said verification module.

10. A system of providing third-party voice authentication according to claim 9, wherein said at least one enrollment engine collects voice samples, process the voice samples for uniqueness, and construct said baseline voiceprints during enrollment of a consumer.

11. A system of providing third-party voice authentication according to claim 9, wherein said at least one verification engine collects voice samples, process the voice samples for uniqueness, and construct said temporary voiceprints.

12. A system of providing third-party voice authentication according to claim 1, wherein said baseline and temporary voiceprints comprise a mathematical model or representation of how a specific person speaks.

13. A system of providing third-party voice authentication according to claim 12, wherein when said verification module compares one of said temporary voiceprints to one of said baseline voiceprints, said verification module generates a score indicative of how similar said baseline and said temporary voiceprints are, and said system transmits said score to the institutional customer thereafter.

14. A system of providing third-party voice authentication according to claim 1, wherein said software associated with said first communication link is interactive voice response (IVR) software.

15. A system of providing third-party voice authentication according to claim 1, wherein a given of said profile includes different values for said variables for different classes of consumers for the same institutional customer.

16. A system of providing third-party voice authentication according to claim 1, further comprising a call manager for routing inbound communication from at least one of the institutional customers or consumers.

17. A system of providing third-party voice authentication according to claim 1, wherein said enrollment module comprises microprocessor-controlled hardware devices, software, and voice biometric engines utilized during consumer enrollment.

18. A system of providing third-party voice authentication according to claim 1, wherein said verification module comprises microprocessor-controlled hardware devices, software, and voice biometric engines utilized during consumer authentication.

19. A system of providing third-party voice authentication according to claim 1, wherein said first communication link allows communication between the consumer and the institutional customer and comprises:
   means for allowing the institutional customers to receive said collected voice samples from said consumers; and
   means for transmitting said collected voice samples from said institutional customers to said server via a data channel.

20. A system of providing third-party voice authentication according to claim 1, wherein said first communication link does not access the institutional customer.

21. A method of providing to institutional customers third-party voice authentication of consumers of the institutional customers, comprising the steps of:
   providing a plurality of voice biometric engines on a third-party voice authentication system remote from the institutional customers;
   for each institutional customer, constructing an authentication profile having instructions indicating which one or more of said voice biometric engines are to be used for a corresponding of the institutional customer's consumer's enrollment or voice authentication and variables for implementing said instructions;
   initially receiving vocal information from one of the consumers and constructing a baseline voiceprint based on the initially received consumer vocal information;
   subsequently receiving vocal information from the consumer and constructing a temporary voiceprint based on the subsequently received vocal information;
   comparing the temporary voiceprint to the corresponding baseline voiceprint in accordance with the authentication profile associated with the institutional customer associated with the given consumer,
   wherein if, during said comparing step, the temporary voiceprint is sufficiently close to the baseline voiceprint based on the authentication profile, the consumer is authenticated.

22. A method of providing third-party voice authentication according to claim 21, further comprising the step of remotely configuring at least one of the variables in the profile by the institutional customer via a communication link.

23. A method of providing third-party voice authentication according to claim 22, wherein the variables in the profile that are remotely configurable by the institutional customer via the communication link include at least one of the following: number of enrollment retries, verification retries, prompt sets, or threshold levels.

24. A method of providing third-party voice authentication according to claim 21, wherein said steps of initially and subsequently receiving vocal information steps are initiated at the direction of the institutional customer.

25. A method of providing third-party voice authentication according to claim 21, further comprising the step of storing a plurality of the authentication profiles on a database within the system.

26. A method of providing third-party voice authentication according to claim 21, further comprising the step of providing at least one call processor to receive the vocal information from consumers.

27. A method of providing third-party voice authentication according to claim 26, further comprising the step of providing an enrollment module in communication with the call processor for collecting voice samples of the consumers from the vocal information and constructing baseline voiceprints of the voice samples.

28. A method of providing third-party voice authentication according to claim 27, further comprising the step of providing a verification module in communication with the call processor and the enrollment module for collecting voice samples and constructing temporary voiceprints for comparison to corresponding the baseline voiceprints.

29. A method of providing third-party voice authentication according to claim 21, wherein said comparing step further comprises the steps of:
  generating a score indicative of how similar the baseline and the temporary voiceprints are; and
  transmitting the score to the institutional customer.

30. A method of providing third-party voice authentication according to claim 21, wherein said step of constructing an authentication profile further comprises the step of providing different values for the configurable variables for different classes of consumers for the same institutional customer.

31. A method of providing third-party voice authentication according to claim 21,
  wherein at least one of said initial or subsequent receiving vocal information steps are performed by the institutional customer, said method further comprising the step of transmitting the received vocal information from the institutional customer to a central server via a data channel.

32. A method of providing third-party voice authentication according to claim 21, wherein said initial and subsequent receiving vocal information steps do not involve the institutional customer.

33. A method of providing third-party voice authentication according to claim 21, wherein said initial and subsequent receiving vocal information steps further comprise at least one of the following steps:
  recording the vocal information for subsequent processing; or
  receiving the vocal information in a streaming manner.

34. A method of providing third-party voice authentication according to claim 21, wherein said steps of initially and subsequently receiving vocal information steps are initiated at the direction of the consumer.

35. A system of providing to institutional customers subscription voice authentication of users of the institutional customers, comprising:
  a first communication link, accessible by the consumers;
  software associated with said first communication link that prompts the consumers to enter vocal responses;
  at least one centralized server in communication with said first communication link;
  an enrollment module on said at least one centralized server in communication with said first communication link for collecting voice samples of the consumers from said prompted vocal responses and constructing baseline voiceprints of said voice samples;
  a verification module on said at least one centralized server in communication with said first communication link and said enrollment module for collecting voice samples and constructing temporary voiceprints for comparison to corresponding said baseline voiceprints;
  at least one voice biometric engine residing on said system and accessible by said verification module for determining how similar a given temporary voiceprint is to one of said baseline voiceprints;
  for each of the institutional customers, a profile residing on said system having instructions indicating what values are to be assigned to a set of variables for a corresponding consumer's enrollment or voice authentication; and
  a second communication link between said system and the institutional customers,
  wherein at least one of the variables in said profile is remotely configurable by the institutional customer via said second communication link, and
  wherein if one of said temporary voiceprints is determined to be sufficiently close to a corresponding of said baseline voiceprints by said at least one voice biometric engine in accordance with a corresponding said profile, the consumer is authenticated.

36. A system of providing subscription voice authentication according to claim 35, wherein said at least one voice biometric engine comprises a plurality of voice biometric engines, and said profile further comprises instructions indicating which one or more of said voice biometric engines are to be used for a corresponding of the institutional customer's user's enrollment or voice authentication.

37. A system of providing subscription voice authentication according to claim 35, said at least one centralized server further comprising:
  an enrollment server on which said enrollment module resides;
  a verification server on which said verification module resides; and
  a client server for processing communications via said second communication link.

38. A system of providing subscription voice authentication according to claim 35, wherein said variables in said profile that are remotely configurable by the institutional customer via said second communication link include at least one of the following: number of enrollment retries, verification retries, prompt sets, or threshold levels.

39. A system of providing subscription voice authentication according to claim 35, wherein said first communication link is accessible by the users at the direction of the institutional customers.

40. A system of providing subscription voice authentication according to claim 36, wherein said voice biometric engines reside on one or both of said modules.

41. A system of providing subscription voice authentication according to claim 37, said at least one voice biometric engines further comprising:
  at least one enrollment engine resident on said enrollment server; and
  at least one verification engine resident on said verification server.

42. A system of providing subscription voice authentication according to claim 41, wherein said at least one enrollment engine collects voice samples, processes the voice samples for uniqueness, and constructs said baseline voiceprints during enrollment of a consumer.

43. A system of providing subscription voice authentication according to claim 41, wherein said at least one verification engine collects voice samples, processes the voice samples for uniqueness, and constructs said temporary voiceprints.

44. A system of providing subscription voice authentication according to claim 35, wherein a given of said profile includes a first set of values for said variables for internal users for a given institutional customer and a second set of values for said variables for external users for the same institutional customer.

45. A system of providing subscription voice authentication according to claim 35, wherein said verification module comprises microprocessor-controlled hardware devices, software, and at least one voice biometric engine utilized during consumer authentication.

46. A system of providing subscription voice authentication according to claim 35, wherein said first communication link allows communication between the consumer and the institutional customer and comprises:
  means for allowing the institutional customers to receive said collected voice samples from said consumers; and
  means for transmitting said collected voice samples from said institutional customers to said server via a data channel.

47. A system of providing subscription voice authentication according to claim 35, wherein said first communication link does not access the institutional customer.

48. A method of providing to institutional customers subscription voice authentication of consumers of the institutional customers, comprising the steps of:
  providing at least one voice biometric engine on a voice authentication system remote from the institutional customers;
  for each institutional customer, constructing an authentication profile having instructions indicating what values are to be assigned to a set of variables for a corresponding consumer's enrollment or voice authentication;
  initially receiving vocal information from one of the users and constructing a baseline voiceprint based on the initially received user vocal information;
  subsequently receiving vocal information from the user and constructing a temporary voiceprint based on the subsequently received vocal information;
  comparing the temporary voiceprint to the corresponding baseline voiceprint in accordance with the authentication profile associated with the institutional customer associated with the given user, and
  remotely configuring at least one of the variables in the profile by the institutional customer via a communication link,
  wherein if, during said comparing step, the temporary voiceprint is sufficiently close to the baseline voiceprint based on the authentication profile, the consumer is authenticated.

49. A method of providing subscription voice authentication according to claim 48, wherein the variables in the profile that are remotely configurable by the institutional customer via the communication link include at least one of the following: number of enrollment retries, verification retries, prompt sets, or threshold levels.

50. A method of providing subscription voice authentication according to claim 48, wherein said providing step further comprises the step of providing a plurality of voice biometric engines, and wherein said constructing step further comprises the step of including in the authentication profile instructions indicating which one or more of said voice biometric engines are to be used for a corresponding of the institutional customer's consumer's enrollment or voice authentication.

51. A method of providing subscription voice authentication according to claim 48, wherein said steps of initially and subsequently receiving vocal information steps are initiated at the direction of the user.

52. A method of providing subscription voice authentication according to claim 48, further comprising the step of storing a plurality of the authentication profiles on a database within the system.

53. A method of providing subscription voice authentication according to claim 48, wherein said comparing step further comprises the steps of:
  generating a score indicative of how similar the baseline and the temporary voiceprints are; and
  transmitting the score to the institutional customer.

54. A method of providing subscription voice authentication according to claim 48, wherein said step of constructing an authentication profile further comprises the step of providing different values for the configurable variables for different classes of users for the same institutional customer.

55. A method of providing subscription voice authentication according to claim 48, wherein at least one of said initial or subsequent receiving vocal information steps are performed by the institutional customer, said method further comprising the step of transmitting the received vocal information from the institutional customer to a central server via a data channel.

56. A method of providing sub subscription voice authentication according to claim 48, wherein said initial and subsequent receiving vocal information steps do not involve the institutional customer.

57. A method of providing subscription voice authentication according to claim 48, wherein said initial and subsequent receiving vocal information steps further comprise at least one of the following steps:
  recording the vocal information for subsequent processing; or
  receiving the vocal information in a streaming manner.

58. A method of providing subscription voice authentication according to claim 48, wherein said steps of initially and subsequently receiving vocal information steps are initiated at the direction of the consumer.

\* \* \* \* \*